US011889026B2

(12) United States Patent
Martin et al.

(10) Patent No.: US 11,889,026 B2
(45) Date of Patent: *Jan. 30, 2024

(54) UNIFIED COMMUNICATIONS CALL ROUTING AND DECISION BASED ON INTEGRATED ANALYTICS-DRIVEN DATABASE AND AGGREGATED DATA

(71) Applicant: 8x8, Inc., Campbell, CA (US)

(72) Inventors: Bryan R. Martin, Campbell, CA (US); Matt Taylor, Campbell, CA (US); Manu Mukerji, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,749

(22) Filed: Aug. 18, 2022

(65) Prior Publication Data
US 2022/0407962 A1 Dec. 22, 2022

Related U.S. Application Data

(63) Continuation of application No. 17/382,106, filed on Jul. 21, 2021, now Pat. No. 11,425,252.

(60) Provisional application No. 63/187,185, filed on May 11, 2021.

(51) Int. Cl.
*H04M 3/523* (2006.01)
*H04M 3/51* (2006.01)

(52) U.S. Cl.
CPC ....... *H04M 3/5233* (2013.01); *H04M 3/5141* (2013.01)

(58) Field of Classification Search
CPC ....... H04L 65/00; H04M 3/51; H04M 3/5141; H04M 3/523; H04M 3/5233
USPC ........................................ 379/265.11, 265.13
See application file for complete search history.

(56) References Cited

U.S. PATENT DOCUMENTS

| 11,425,252 B1 * | 8/2022 | Martin | H04M 3/5141 |
| 2009/0112875 A1 * | 4/2009 | Maes | G06F 16/27 |
| 2014/0100848 A1 * | 4/2014 | Shaffer | G10L 15/22 |
| | | | 704/E15.001 |

(Continued)

*Primary Examiner* — Harry S Hong
(74) *Attorney, Agent, or Firm* — Crawford Maunu PLLC

(57) ABSTRACT

Exemplary aspects involve a data-communications apparatus or system communicate over a broadband network with a plurality of remotely-located data-communications circuits respectively associated with a plurality of remotely-situated client entities. The system includes data-communications platform (e.g., UC-CC) that processes incoming data-communication interactions including different types of digitally-represented communications among which are incoming call, and that is integrated with a memory circuit including a database of information sets. Each of the information sets includes experience data corresponding to past incoming data-communication interactions processed by the platform, and with aggregated and organized data based on data collected in previous incoming interactions. The platform accesses the database and may: use past interactions and other data sources; and facilitate an automated self-service experience for users by resolving inquiries discerned through the incoming interactions; and/or effecting call-decision routing of incoming interactions to call-center agents or specialists.

23 Claims, 7 Drawing Sheets

(56) References Cited

U.S. PATENT DOCUMENTS

2016/0227035 A1\* 8/2016 Kumar ................ H04M 3/5233
2017/0006161 A9\* 1/2017 Riahi ...................... H04L 51/02

\* cited by examiner

UNIFIED COMMUNICATIONS CALL ROUTING AND DECISION BASED ON INTEGRATED ANALYTICS-DRIVEN DATABASE AND AGGREGATED DATA

OVERVIEW

Aspects of the present disclosure are generally directed to data-communications and computer servers.

Computer servers are increasingly being used to provide various services over a network including, but not limited to, VoIP communications services such as VoIP calls, video conferencing, call exchange servers, packet switching, and traffic management as well as non-VoIP services including, but not limited to: website hosting, remote data storage, remote computing services, and virtual computing environments.

The use of VoIP telecommunications services has been widespread and significant in terms of both numbers of users and types of services/systems being made available. This growth can be attributable to any of a wide variety of socio-economic changes such as the mobility of users of these services, the types and reduced costs of portable telecommunication tools, and the ever-evolving technology adapting to the personal and business needs of the telecommunications users. Due to wide-spread needs of such users and the many disparate types of services/systems being made available, cohesive integration of such services/systems for secure and efficient operations has been problematic. Consequently, users attempting to use such systems have experienced difficulty and oftentimes significant delay and frustrations when these systems have attempted to intercept the user communications. For example, these experiences often ensue from auto-attendant processors attempting unsuccessfully to discern the reasons for users having called a certain entity.

SUMMARY

Various example embodiments are directed to issues such as those addressed above and/or others which may become apparent from the following disclosure concerning processing and resolving and/or routing of inbound communications from users as may be received by a data-communications system.

In certain examples, specific embodiments and aspects are directed to a data-communications system having data-communications server platform that provide integrated and unified data-communications services by capturing and analyzing digital data received over a broadband network as incoming interactions. The data-communications server platform is configured to enable end-users to communicate audio via Voice over Internet Protocol (VoIP) and/or one or more different types of communications such as text, email, etc. By capturing and analyzing the received digital data with a call-routing engine which is internal to the platform, inquiries in the incoming interactions are discerned and/or resolved with call-decision routing of the incoming interactions to designated call-center agents or specialists (e.g., subject matter experts) having specific knowledge of the matter(s) of the discerned incoming interactions. For example, by aggregating data associated with client entities and/or end users, an integration of data-analytics and call-decision processing is used to identify and direct an outcome of such inquiries even if the inquiries are received via relatively rudimentary audio conversations through an auto attendant, thereby permitting users behind the respective incoming interactions an efficient and non-frustrating automated self-service experience.

In other example embodiments, a data-communications system and/or related method communicate over a broadband network with a plurality of remotely-located data-communications circuits respectively associated with a plurality of remotely-situated client entities. This particular system includes a communications platform that functions as an unified-communications and call center (UC-CC) platform for processing incoming data-communication interactions including different types of digitally-represented communications among which are incoming calls or interactions, and that is integrated with a memory circuit including a database of information sets. Each of the information sets includes experience data corresponding to past incoming data-communication interactions processed by the platform, and with aggregated and organized data based on data collected in previous incoming interactions. The platform accesses the database and may: use past interactions and/or other data sources; and facilitate an automated self-service experience for users by resolving inquiries discerned through the incoming interactions; and/or effecting call-decision routing of incoming interactions to call-center agents or specialists.

In further example embodiments which may build on one or more of the above data-communications systems and/or related methods: the automated self-service experience may include: a party to be automatically selected, in response to the UC-CC platform accessing the database, to be bridged and joined into the respective one of the incoming interactions; the resolution of inquiries discerned through the incoming interactions; and the call-decision routing of the incoming interactions to designated call-center agents or specialists having specific knowledge of subject matter discerned through the incoming interactions; and/or the database may include representations of digital voice data associated with transcribed audio conversations which correspond to one or more of the incoming interactions, and further geographic information and/or calendar information provided by or associated with the one or more of the incoming interactions, wherein the representations of digital voice data include keywords and speech characteristic parameters associated with outcomes of or with contexts relating to the transcribed audio conversations.

In yet further example embodiments which may build on one or more of the above data-communications systems and/or related methods, the UC-CC platform accesses the database via an access pathway to a manager circuit configured to permit and coordinate the reads and/or writes to the database and, in more specific embodiments, the access pathway to the database manager circuit is integrated with the UC-CC platform in that the access pathway does not traverse more than one broadband gateway circuit and does not traverse more than one security-based firewall circuit.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the drawings included in the attached Appendices and the accompanying drawings, in which example aspects and embodiments are illustrated according to the present disclosure as follows.

Figure 1A:
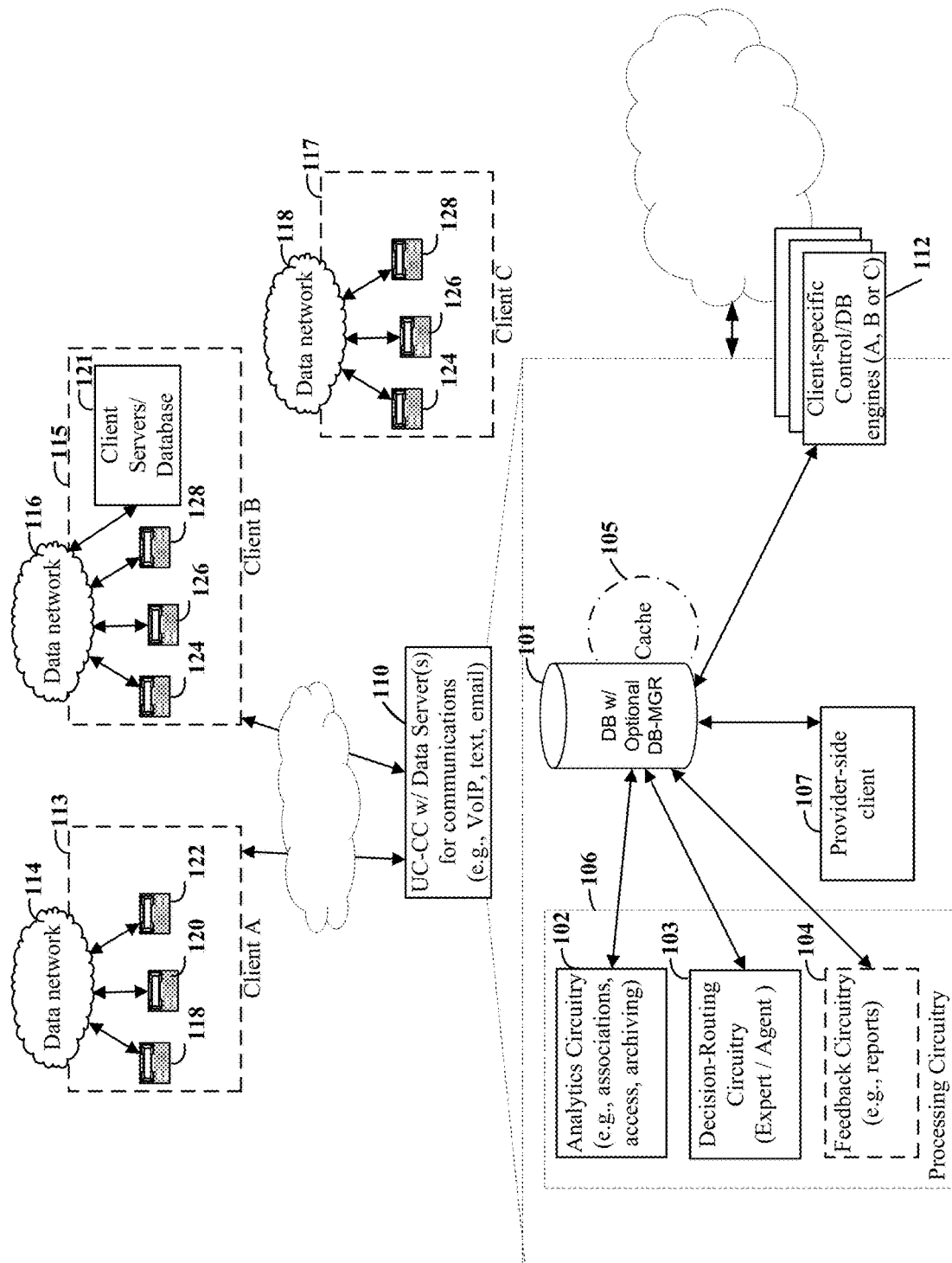
FIG. 1A illustrates an example data-communications system.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses and methods concerning provision of digital-communications services and systems involving decisions to route incoming calls (or "interactions") and processing and analysis of the same, whether as voice, text, email data, etc. In certain implementations, aspects of the present disclosure have been shown to be beneficial when used in a Voice over Internet Protocol (VoIP) system including a VoIP communications server that interfaces with a plurality of remote-situation client entities. While the present disclosure is not necessarily limited to these types of exemplary communications systems, for purposes of facilitating understanding and appreciation of certain embodiments, the following discussion uses such services and systems in the context of a service-provider data-communications platform providing communications to different client entities which subscribe to such services as may be offered from a service-provider which manages and/or operates the platform.

In one such example, the data-communication system may include: a platform integrating operations associated with a unified-communications and a call center. The platform, which may be referred to as a UC-CC platform, includes a memory circuit having a database of information sets and includes a computer circuit to receive and process incoming data-communication interactions ("incoming interactions") and these incoming interactions may be any of among a variety of different types of digitally-represented communications (VoIP calls, incoming text communications, etc.). The memory circuit is integrated with the UC-CC platform, and each of the information sets includes experience data which represents aspects of past incoming data-communication interactions processed by the unified-communications and call center platform. Each of the information sets may also have data aggregated and organized based on data collected in response to previous ones of the incoming interactions.

The UC-CC platform may be integrated with the memory circuit to respond to a respective one of the incoming interactions by: accessing the database, through reads from and/or writes to at least one of the information sets associated with the respective one of the incoming interactions; utilizing from past interactions and at least one other data source; and facilitating, in response to the utilization of the data and to the access of the database, an automated self-service experience for respective users or originators of the incoming interactions through their processing. The automated self-service experience includes at least one of: resolution of inquiries discerned through the incoming interactions; and call-decision routing of the incoming interactions to designated call-center agents or specialists having specific knowledge of subject matter discerned through the incoming interactions.

FIG. 1A illustrates one such example data-communications system in block diagram form and consistent with certain of the above-related examples and aspects of the present disclosure. As shown in FIG. 1A, the data-communications system includes a data-communications server 110 configured to provide data communication services, including data communications such as VoIP calls and other types of interactions (e.g., text, chat, email, etc.), for a plurality of endpoint devices 118, 120, 122, 124, 126, 128 connected in one or more data networks 114, 116. In more specific embodiments, the data-communications server 110 includes an arrangement of coordinated servers such as one or more VoIP communications servers that provide VoIP communications and one or more other types of communications servers that provide such other forms of data communications service(s). Although FIG. 1A illustrates two data networks 114, 116 communicatively coupled to the data-communications server 110, examples are not so limited and the data-communications server 110 can be communicatively coupled to three or more data networks, including as examples but not limited to broadband networks such as the Internet, cellular-telephony and/or satellite communications networks, etc. Such networks and communicatively-coupled endpoint devices are configured to communicate with one another (directly and/or indirectly) using data-communications circuits which are typically wireless transceivers with user interfaces (graphic user interfaces, audible, etc.). For purposes of facilitating discussion, various specific embodiments are herein directed to methods and apparatuses that include the data-communications server 110 and processing circuitry 106 in one or more of the above-noted variety of forms. Although the processing circuitry 106 is illustrated as a component of the data-communications server 110, embodiments are not so limited and the processing circuitry can form part of or be separate from the data-communications server 110.

The endpoint devices are circuit-based instruments that may be used by personnel (or users) and include data communications-enabled circuitry, such as VoIP-enabled endpoint devices (e.g., IP phones, smart phones, tablets, and/or desktop computers with appropriate VoIP software applications) and/or non-data communication/VoIP enabled endpoint devices (e.g., plain old telephone service (POTS) telephones and cellular-capable devices). Each endpoint device may be respectively associated with an account of a respective client. Endpoint devices can be associated with a particular client account by registering the endpoint device with a particular client account serviced by the data-communications server 110. Registered devices for each client account can be listed in a respective account settings file (not shown) stored by the data-communications server 110. In this example, endpoint devices 118, 120, and 122 are associated with an account 113 for a first client A and endpoint devices 124, 126, 128 are associated with an account 115 for a second client B. In such a manner, a plurality of endpoint devices can each be serviced by the data-communications server 110 in accordance with aspects of the present disclosure. One or more of the clients can have client servers and/or databases 121 used to implement a variety of different services.

Accordingly, the endpoint devices are data-communications circuits which may be remotely located relative to the data-communications server 110 and may be respectively associated with remotely-situated client entities. In certain but not all embodiments, the data-communications system may include the remotely-located data-communications circuits, and in some instances one or more of the endpoint devices correspond to and/or includes a computer or a smartphone (e.g., mobile phone or tablet) to function as a softphone by running application software; and/or a computer or a smartphone to operate natively within a web browser (e.g., using webRTC) and in turn the web browser is to run on a computer or a smartphone.

The system may include one or more processing circuits configured to implement client-specific control engines 112, which are configured to adjust the data-communications provided for each client account according to a respective set of control directives. For instance, the client-specific control engines 112 can adjust routing of an incoming interaction (e.g., a VoIP-type data or text communication) to or from a client account by generating client-specific sets of control data to the data-communications server 110.

In certain different embodiments, the client-specific control engines 112 are implemented in various locations. For example, client-specific control engines 112 for one or more client accounts can be implemented in a central server connected to, or incorporated with, the data-communications server(s) 110. Additionally or alternatively, one or more client-specific control engines 112 can be implemented by one or more processing circuits maintained by the client including, for example, database circuit 101 which may include a database manager such as the above-described type. Similarly, the control directives can be stored locally within the client-specific control engines, or stored remotely (e.g., in a centralized database, in a database maintained by the client or a combination thereof). In certain specific examples, the database manager circuit (or database 101) refers to or includes a relational database management system (RDMS) which stores data securely and returns the data in response to requests from other applications, as implemented by a database management server, and which can temporarily store data in cache 105.

In one specific example, the form of the system shown in FIG. 1A includes the data-communications server 110 configured as a unified-communications and call center (UC-CC) platform that processes incoming data-communication interactions including different types of digitally-represented communications (e.g., text, chat, email, etc.). The platform is integrated with a memory (database) circuit 101 (optionally with cache memory 105 for quick access to high-priority calls or calls requiring relatively significant analysis and processing). The memory circuit includes database having a plurality or a plethora of information sets. Each of the information sets includes user/client-entity contact information and/or experience data corresponding to past incoming data-communication interactions processed by the platform, and with the information sets being populated via an aggregation of organized data based on data collected in previous incoming interactions. The platform regularly accesses the database to assess the incoming interactions and may use past incoming interactions along with information collected via other data sources (e.g., internal to the system such as AI/ML modeled data and/or $3^{rd}$ party information). By analyzing the incoming interactions and accessing possible associations relative to the information sets in the memory circuit 101; the platform is able to facilitate an automated self-service experience for users by resolving inquiries discerned through the incoming interactions and/or effecting call-decision routing of incoming interactions to call-center agents or specialists.

Such automated self-service experiences provided via the data-communications server 110 of FIG. 1A may be realized by the processing circuitry 106 including various circuits (e.g., servers, software-directed aspects of CPU(s), logic circuitries, etc.) such as having analytics circuitry 102 to analyze an incoming interaction relative to content in the database 101 and/or to AI/ML models (not shown in FIG. 1A), having decision-routing circuitry 103 for deciding whether and/or how an incoming interaction should be routed, and in certain more specific examples or applications also having feedback circuitry 104. In specific embodiments, the data-communications server 110 may use the analytics circuitry 102 to analyze an incoming interaction by capturing and analyzing digital voice data from spoken conversations in connection with incoming interactions such as between agents of a client entity and customers. The spoken conversations may be transcribed from audio to digital voice data by the data-communications server 110, the endpoint device of the agent via a client on the endpoint device, and/or client data-communications server. The transcription of the spoken audio words to digital voice data can occur via a variety of methods. By discerning the contact information and/or other content (e.g., context of call and/or the transcription), the decision-routing circuitry 103 can access the information sets so as to check for associations and, if certain associations relevant to the current (e.g., live) call, the call may be routed as indicated by an associated one of the information sets, by user/client-entity profile settings stored with or linked to the associated one of the information sets, and/or based on a metric indicating sufficient confidence that the routing the call to a specific designation (e.g., to an expert such as a specialist having been training or otherwise having special knowledge regarding topic discerned from the call, or to an agent/manager who is assigned to the topic or incoming interaction), and each such decision may be discerned by accessing and analyzing the information sets.

Further aspects and example (optional) responsibilities of these circuitries 102, 103 and 104 are discussed further below, for example, in connection with related examples such as an example block diagram shown in FIG. 1B, an example application shown in FIG. 1C, and in connection with example manners in which incoming interactions (calls) may flow as in the diagram of FIGS. 3A and 3B.

In various embodiments, the data-communications system can also track a variety of information, parameters and/or metrics related to calls (i.e., incoming interactions) made or received by the agents of a client entity via processing circuitry 106 that is communicatively coupled to the data-communications server 110. The parameters can include information such as average call duration, compliance of call opening and account information, identification of issues and troubleshooting, resolution, professionalism, and other metrics. The parameters can be scored (e.g., percentage or other value scored) to rate the particular agent on each particular call and to form a metric used to assess an agent. In some embodiments, the parameters and/or metrics can be assessed automatically by the system using keywords. In other embodiments and/or in addition, the calls are recorded and can be replayed for a person to score (or update an automatic score) on the metrics. The parameters and/or metrics can be used to determine an outcome of the call. For example, the resolution can be indicative of the outcome. The scores can be reviewed upon recording the calls which can be reviewed by a reviewer. For example, the reviewer can listen to the call recording while a user interface is displayed on a computing device associated with the reviewer. The user interface displayed can illustrate a timeline of the recorded call, which can show timing of the current voice data being played. The timeline can allow the reviewer to navigate within the call by selecting portions of the timeline to change what the reviewer is listening to. Additionally, the agent and the customer can have different waveforms for efficient reviewing. In other embodiments, other types of analysis are used, as further described herein.

In a number of embodiments, a particular client can customize the metrics that are to be tracked such as by the server 110 of FIG. 1A. Such customization can include the type of metrics, values given, and/or particular phrases or statements for complying with the metric (e.g., a specific call opening). For example, the customization can include definitions of performance expectations and scores, as well as performance thresholds for various metrics.

In a number of embodiments, a particular client can customize the metrics that are tracked. Such customization can include the type of metrics, values given, and/or particular phrases or statements for complying with the metric (e.g., a specific call opening). For example, the customization can include definitions of performance expectations and scores, as well as performance thresholds for various metrics.

As previously described, client-specific control engines can be used to facilitate adjustment of a variety of remote services including, for example, data-communication services such as VoIP calls, audio and/or video conferencing, general private branch exchange services, packet switching, chat, and traffic management as well as non-VoIP services including, but not limited to, website hosting, remote data storage, remote computing services, and virtual computing environments. One or more of such services can be provided, for example, by a cloud computing network having one or more servers configurable for a plurality of clients.

As may be appreciated, audio from an incoming interaction (e.g., incoming VoIP and/or video call) can be transcribed to text using a variety of techniques. As an example, an audio file can be generated and provided to speech recognition circuitry, which can be part of the endpoint device, the data-communications server 110, or other external circuitry. The audio file, which includes an acoustic signal received by a microphone of the endpoint, is converted or transcribed to text (e.g., a set of text words) by the speech recognition circuitry. In various embodiments, the speech recognition circuitry can use a voice model and/or database of words for converting or transcribing the audio to text. For example, the speech recognition circuitry can index the words in the audio file to identify words or phrases, such as using an extensible markup langue (XML), structured query language (SGL), mySQL, idx, and other database language. For more general and specific teachings on transcribing audio to test, reference is made to U.S. Publication No. 2009/0276215, filed on Apr. 17, 2007, entitled "Methods and Systems for Correcting Transcribed Audio Files;" U.S. Pat. No. 7,236,932, filed Sep. 12, 2000, entitled "Method of and Apparatus for Improving Productivity of Human Reviewers of Automatically Transcribed Documents by Media Conversion Systems;" and U.S. Pat. No. 6,424,935, filed Jul. 31, 2000, entitled "Two-way Speech Recognition and Dialect System," each of which are fully incorporated by reference for their teachings.

As illustrated in FIG. 1A, the data-communications server 110 interfaces with a plurality of remotely-situated client entities and includes or is otherwise in communication with processing circuitry 106. The processing circuitry 106 can receive digital voice data indicative of transcribed audio conversations between a plurality of agents and customers of a remotely-situated client entity and identify keywords and speech characteristic parameters from the digital voice data. In specific embodiments, the data-communications server 110 captures the digital voice data via a client on the agent side which may be communicating with a web client contact center and a client on the server side (e.g., a provider-side client as a circuit-based module inside the server 110) and provides the digital voice data to the processing circuitry 106. In other embodiments, the agent-side client communicates the digital voice data to the provider-side client. The provider-side client then provides the digital voice data to the analytics circuitry 102 for identification of keywords and/or speech characteristic parameters. The identification can include analyzing the digital voice data for matches to keywords and speech characteristic parameters stored in an archive and/or database 101.

As may be stored in the various information sets of the database 101, keywords and/or speech characteristic parameters can be associated with outcomes, in some embodiments. Example outcomes can include sale, no sale, positive or negative tone/sentiment. A tone or sentiment of the audio conversation can indicate how the call is perceived by the customer. A tone or sentiment can be identified based on the speech characteristic parameters. Example speech characteristic parameters include frequency, velocity, and amplitude of the conversation.

In a number of specific embodiments, the speech characteristic parameters can be compared to one or more thresholds. For example, the processing circuitry 106 via the analytics circuitry 102, using the provider-side database 101, can identify a speech characteristic parameter which is outside of a threshold value (e.g., indicating an issue or potential problem), and which can correspond to or be indicative of a tone or sentiment of the conversation. As a specific example, audio above a particular amplitude and velocity can be indicative of a customer or agent who is upset or otherwise agitated. The thresholds can include generic thresholds (anything above a particular value), thresholds that are specific to geographic regions or types of customers, and/or baseline values of the specific speaker or agent. For example, if the speaker or agent's speech is faster and louder than their baseline, the speech may be indicative of an issue in the conversation. Further, for certain of certain of the endpoint devices identified in the information sets and/or by way of the content of the incoming interactions being associated with certain conditional actions, the server 110 may predict or load the cache in anticipation of such speech and the call may be routed to a manager or other designated handler (e.g. other agent) better prepare to handle the call.

The processing circuitry 106 can provide association of the keywords and/or speech characteristic parameters with outcomes based on the analysis. The associations can be stored in the database 101 and/or provided to a client data-communications server 121 as feedback via the feedback circuitry 104. The feedback can be provided to a manager of the client entity and used for training purposes. Alternatively and/or in addition, the feedback can be provided to the particular agent in real time or near real time, such as while the audio conversation is ongoing. The feedback can include specific phrases to use and/or suggested changes in speech characteristic parameters.

In other embodiments, the feedback is provided to a manager, such as via a report that summarizes a subset of agents for the client entity. The report can include customer interaction feedback using the associations indicating negative and positive outcomes and associated keywords and/or speech characteristic parameters.

In some embodiments, the processing circuitry 106 can identify a speech characteristic parameter outside of a threshold value (i.e., indicates problem) or a keyword that is associated with a (manager) trigger, and in response, automatically bridge a manager of the respective agent into the audio conversation. The processing circuitry 106 and/or the data-communications server 110 can access a database to identify the manager and information for bridging the manager into the audio conversation.

In some examples, the processing circuitry 106 can store the associations in a database as an archive that is accessible and that ties the keywords with dates of the conversations and the speech characteristic parameters of the particular transcribed audio conversations. The archive can be adjusted over time based on additional audio conversations. For example, the processing circuitry 106 can adjust the associations over time based on further analysis of digital voice data and provide the adjustments as feedback. Alternatively and/or in addition, the adjustments can be based on user input, such as an input from an agent or a manager, as further described herein based on a tone/sentiment and/or keywords. In the following discussion, various implementations and applications are disclosed to provide an understanding of the instant disclosure by way of non-limiting example embodiments exemplified by way of VoIP-type data communications which typically involve a data-communication server communicating with an endpoint device, such as a VoIP-enabled endpoint device ("VoIP device") via a broadband network (e.g., Internet, WiFi, cellular) to connect with the data-communication server that is managed by an VoIP provider such as 8×8, Inc. and/or an Internet Service Provider (ISP) such as Yahoo or Google. Through such a server, call routing and other data communications services are managed for the endpoint device.

Users of a data-communications system can use a plurality of communication services to communicate with clients and other professionals and to carry out various tasks. For example, agents of a client entity can use a private network application to generate work products, a cloud-based application to manage service issues, another cloud-based application to manage direct communications such as email and chat messages, and yet another cloud-based application to manage financial matters such as billing and invoicing. In many instances, it can be beneficial for an entity subscribed to or that otherwise uses the data-communications system to analyze audio conversations across the entity (or across many entities) to improve subsequent interactions with the client or professional. For example, as a particular agent of an entity is conversing vocally with a client, the spoken conversation is captured and transcribed from audio to digital voice data (e.g., audio to data). In specific aspects, a data-communications server operated by the data-communications provider can capture and analyze conversations of many (e.g., 10,000 or more) agents, which can be stored in a directory. A client on the agent side can communicate with a web client contact center (e.g., via virtual access via the Internet), and a client on the provider side. In some embodiments, the client on the agent side can transcribe the conversation from audio to the digital voice data. In other embodiments, the client on the agent side can communicate the audio to a data-communications server operated by the entity, which transcribes the audio to digital voice data using processing circuitry in communication therewith. The processing circuitry can form part of the data-communications server or be separate therefrom. As used herein, the digital voice data is indicative of transcribed audio conversations between agents and others (e.g., customers or other external personnel) of remotely-situated client entities.

In specific embodiments, the processing circuitry analyzes the received digital voice data, the digital voice data being from the data communication services provided by the data-communications server. The analysis can include identifying keywords and speech characteristic parameters from the digital voice data, which can be, alone or together, indicative of a tone or a sentiment of a conversation (e.g., is the conversation going well or not). Example speech characteristic parameters can include a frequency, wavelength or velocity, and/or amplitude of the audio. In some embodiments, the speech characteristic parameters can be compared to a baseline of the agent to determine a tone. In other embodiments and/or in addition, speech characteristic parameters of the customer can be compared to thresholds to determine a tone. In a number of embodiments, the threshold can be different for different geographic regions, different types of customers (e.g., age, sex), different industries, among other types of classifications. In addition, particular keywords can be associated with and/or indicate a greater probability of a particular tone, sentiment, and/or outcome. As a particular example, the phrases "I want to speak to a manager" or "What is your name" can be associated with a conversation that is not going well for the agent. In other instances, "What is your name" at a particular frequency can be indicative of a positive outcome (e.g., an agent resolves an issue and the customer would like to commend the agent). Although as may be appreciated by one of ordinary skill in the art, embodiments are not so limited and can include a variety of different associations. Further, in various embodiments, the same keywords or phrases can indicate different tones or outcomes for different types of customers.

The identified keywords and speech characteristics can be associated with outcomes of the transcribed audio conversation. The associations can be provided in an archive stored on a memory circuit and which can be updated over time. In various embodiments, the outcome can be determined based on the keywords and/or metadata in the digital voice data. For example, the processing circuitry can identify the keywords and compare them to previously-identified associations of keywords and outcomes. As a specific example, an entity can initially set-up an archive to include associated words and phrases that indicate a sale has occurred, a subscription is continued, a customer hangs up prior to a sale, etc. Alternatively and/or additionally, the archive can include thresholds for speech characteristics parameters that are indicative of different tones or sentiments. The thresholds can indicate or otherwise be associated with a positive conversation, a negative conversation, and changes in threshold indicating a change from a positive to negative or negative to positive conversation. Such thresholds can adjust over time based on feedback into the system and corrections by agents. For example, prior to storing an outcome as associated with a keyword and/or speech characteristics parameter, the outcome and the association can be provided to the agent and/or to a manager for review and approval. In response to an input verifying the outcome, the association is stored. In response to an input correcting the outcome, the associated is not store or a revised outcome is associated with the speech characteristics parameter and stored.

The analysis of the digital voice data can be used for training purposes. For example, a particular agent is provided feedback after the call on what keywords to avoid and/or strategies for the next call. More specifically, the feedback can include providing the association(s) to the client data-communications server and/or to the endpoint device of the agent. In a number of specific embodiments, the feedback or training can be provided in real time or near-real time during the audio conversation. For example, the agent, via an endpoint device (e.g., a computer or otherwise) can be provided a display or audio that cannot be heard by the customer, that indicates keywords to avoid, keywords to use, and/or directs the user to change their speech pattern (e.g., slow your speech down, take a deep breath). In some specific embodiments, specific keywords, alone or in combination with specific speech characteristic parameters, can cause an auto-trigger for connecting a manager to the audio conversation. For example, another endpoint device that is used by the manager can be bridged to the data communication, such as a VoIP call. The data-communications server can access a database to identify the manager and information for connecting the manager into the audio conversation. In this way, a manager can be bridged into a call without additional action by the agent. In some instances, different customers can have different keywords or speech characteristic parameters that trigger the connection with the manager. These keywords or speech characteristic parameters can be based on previous audio conversations with the customer, identification of a category of customer (e.g., important customer that is ranked 10 on a scale of 1-10), among other analytics.

In various embodiments, the processing circuitry and/or the data-communications server operated by the data-communications provider or a client side server can analyze the associations over a period of time, and generate a report indicating different outcomes and associated keywords and/or speech characteristics parameters. Such reports can be used for training purposes and can also be used to identify different patterns. For example, customers from different geographic regions can interact similarly or differently from one another. As previously described, specific keywords or tones can indicate different outcomes based on geographic regions, markets, type of customer, etc. The data-communications server and/or processing circuitry (which may be optionally integrated with this server) can provide assessment of a quality of calls based on the analysis, and provide feedback to the entity. The feedback can be used for training, which can be provided in real time during the call or after.

In some specific embodiments, the analytics can be provided as a service by the data-communication (e.g., VoIP) provider. For example, the analytics can identify keywords and/or tones/sentiments that result in positive outcomes, and also keywords that provide faster outcomes. Additionally, the metrics used to assess the outcome and/or the quality of the call can adjust over time. The adjustment can be responsive to additional digital voice data, and/or verification or adjustment by the agents or a manager to ensure the determined outcomes are correct. In a more specific example, the feedback can be provided by identifying customer-interaction metrics in the digital voice data. In some embodiments, the associations can be locked and a manager reviews the recommended adjustments (by the agent) and approves or denies the adjustment. The customer-interaction metrics include values or ratings of an interaction of an agent with a customer. For example, the customer-interaction metrics can include different ratings which can be impacted by the use or non-use of specific keywords, phrases and speech characteristic parameters.

The processing circuitry can analyze the data over time and across a plurality of agents. For example, particular agents can be identified for an entity that have customer-interaction metrics outside a threshold value. Such agents, for example, can be provided feedback, as described above, for training purposes. The feedback can include identification of customer-interaction metrics to adjust for potentially better outcomes or specific outcomes (e.g., a sale or customer retention). In some instances, the feedback is provided in real time and/or during the conversation, such as recommended phrases to the say to the customer and/or recommended adjustments in the agent's tone. The customer-interaction metrics can be tracked over time and/or adjusted using digital voice data of additional audio conversation.

Figure 1B:
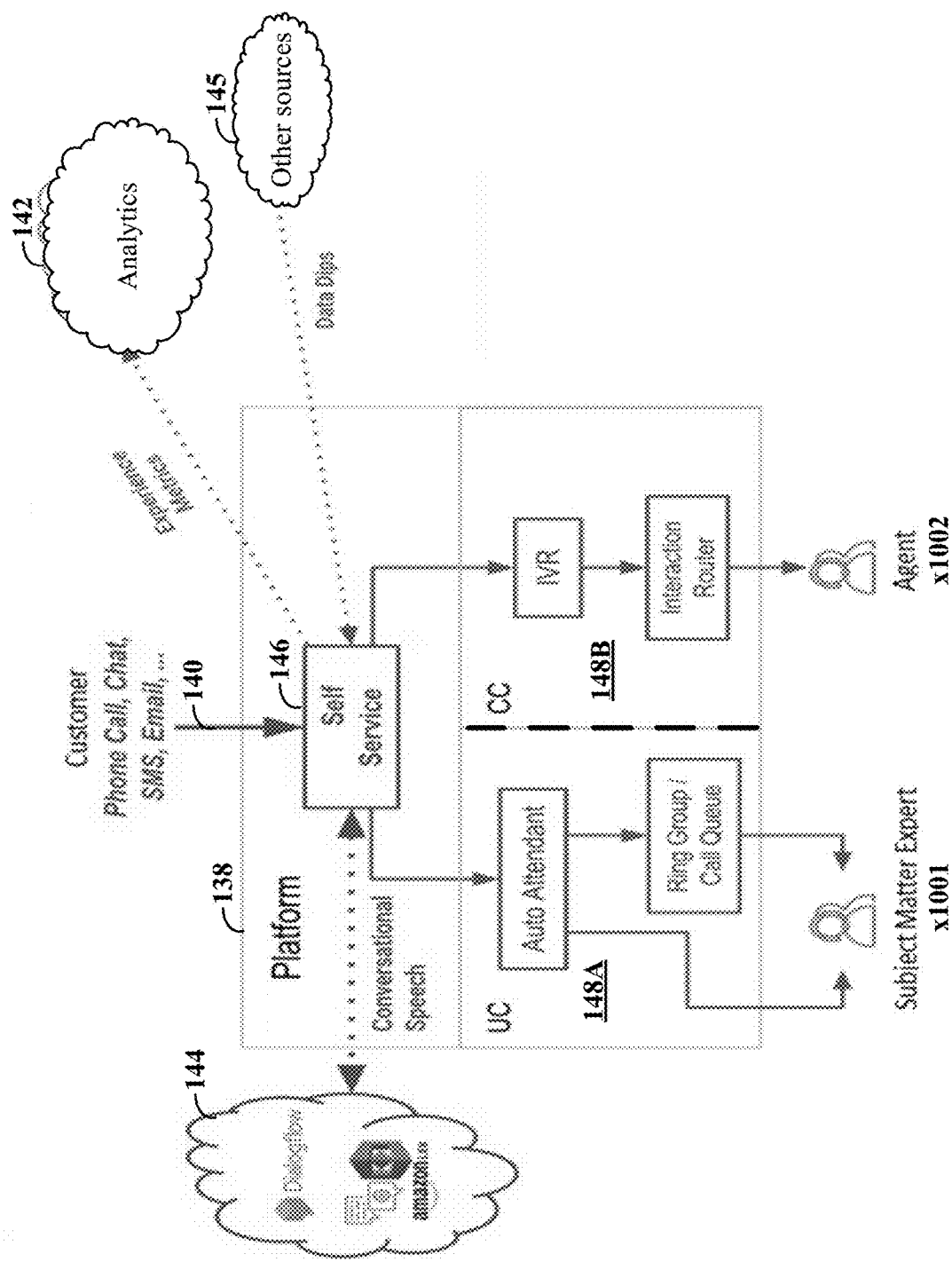
FIG. 1B illustrates another example data-communications system which is related to the system shown in FIG. 1A.

Another form of an example data-communications system is shown in FIG. 1B, which bears similar aspects as the system depicted in FIG. 1A. The example system of FIG. 1B also includes a data-communications server 138 configured as a unified-communications and call center (UC-CC) platform, which is shown receiving different types which include the types of incoming interactions via one or more network channels at 140 similar to as discussed with FIG. 1A, and also incoming interactions associated with the server 138 engaging in conversational speech and with other data sources at via connections to other circuit-communicative endpoints through a broadband network (e.g., cloud-based). This pathway is shown connecting to external audio/video-communication-enabled equipment such as CPUs, smartphones, robots, etc.

An analytics (CPU) processor circuit 142 and other database/source circuitries 144 are shown being integrated with the server 138 but separated by pathways via one or more broadband connections. The analytics processor circuit 142 may be use as directly corresponding to the analytics circuitry 102 of FIG. 1A, or alternatively the server 138 may have the analytics circuitry internal (not shown in FIG. 1B) and the analytics processor circuit 142 may be used selectively by the server 138 to complement the data and associations of the information sets stored in the analytics circuitry internal to the server 138. The other database/source circuitries 144 permit the server 138 to be connected to other sources of information including, as examples, AI/ML resource services which may be trained via data fed by the server 138, customer systems, $3^{rd}$ party servers (e.g., Lexis and Westlaw (online research), Salesforce™, Microsoft Dynamics, and other applications for business, research, etc.

The server 138, as shown with conceptual (not physical separation of) responsibilities at 148A and 148B, processes each of these different types of interactions via an integrated memory (e.g., the database circuit 101 of FIG. 1A) for access to information sets which may have user/client-entity contact information and/or experience data corresponding to past incoming data-communication interactions processed by the UC-CC platform. The server platform receives and initially processes an incoming interaction via channel 140 so that an initial step of analysis may be performed. This initial step of analysis, which again may be performed conceptually on one or both the UC and CC sides, may involve for example, security authorization, gate-way passing and/or handing off the incoming interaction to another module within the server or outside the server for further analysis such as the analytics processor circuit 142.

The vertical dashed line is used to show separation of responsibilities of the server conceptualized via UC side 148A and CC side 148B of the server platform; however, in certain example embodiments of the instant disclosure these UC-side and CC-side responsibilities may be actually implemented via physical/logical integration in various ways including the following specific examples performed by the platform/processing_circuit to provide an integrated secure-access environment and being performed as only one or a combination of one or more of the following. First, a high-level security-based firewall circuit for accessing one or more of the circuitries 101, 142 and/or 144 with secondary/tertiary level checks before granting accesses. Second, access to one or more of the circuitries 101, 142 and/or 144 being granted with the access pathway implemented as an internal bussing structure controlled by a database manager internal to the UC-CC platform, so as to control access requests to/from the platform. Third, granting such accesses while prohibiting traversal of any broadband gateway circuit and/or of any security-based firewall circuit. Fourth, granting such accesses so long as data provided from one or more of the circuitries 101, 142 and/or 144 so long as data provided from any one or more of the circuitry or circuitries 101, 142 and/or 144 occurs via a single access-based request-and-receive-data transaction, for example, a "single dip" transaction, involving only one of the circuitries 101, 142 and/or 144. Fifth, a limited number of such access-based request-and-receive-data transactions, for example, a "double dip" involving two transactions to any one of the circuitries and/or involving two transactions to two of the circuitries 101, 142 and/or 144 (or alternatively, a "triple dip" involving three transactions collectively to two or to three of the circuitries 101, 142 and/or 144). Sixth, granting such accesses while prohibiting (or exclusively permitting certain types of) data from being provided over any or one or more particular broadband networks, any or one or more particular gateways, and/or any or one or more particular security-based firewall circuits. Again, two or more these examples may be used in combination, for example, with the sixth example being used with fourth or fifth example.

Next, the incoming interaction may be processed by circuit-based modules which traditionally are more closely associated with only one of the UC and CC sides. For example, as depicted in FIG. 1B at the UC side, activities may involve functionality auto-attendant operations and/or a ring-group/call-queue operations to permit incoming callers to access experts/specialists (e subject matter expert) having special knowledge concerning the nature, purpose or context of the incoming interaction as discerned by the analytics processing of the incoming interaction and/or as indicated by answers from the initiator (e.g., caller) of the incoming transaction to automated subject-based hierarchical queries from the server back to the initiator. The server/processing_circuit may route such a particular incoming interaction to a discerned one of various possible selected experts (or specialists) having a high likelihood of being able to address the issue of the incoming transaction. In more specific example embodiments, the server/processing_circuit may decide at which point to route the incoming transaction to such an expert or specialist (via real or virtual system extension x1001) based on a confidence level, relative to a fixed or variable threshold, that the discerned issue has been more than likely recognized as matching the knowledge category/categories of the expert or specialist. Moreover, the threshold and/or the manner in which the issue is discerned may be based on the server/processing_circuit assessing data from, as examples: information set(s) accessed in the database (e.g., 101 of FIG. 1A); analytics circuitries/modules (which may or may not include AI/ML models) whether internal to the data-communications system and/or external via a broadband and gateway to/from the system (e.g., via analytics processor and/or other database/source circuitries 142, 144 of FIG. 1B).

At the CC side, activities may involve interactive voice recognition (IVR) operations to permit incoming callers to access information automatically via a voice response system of prerecorded messages without having to speak to an agent, and/or use menu-driven options to have their calls routed to specific departments or specialists, with or without similar confidence assessment as described above in connection with the server/processing_circuit assessing data from the above-noted examples (e.g., via 101 of FIG. 1A and/or 142, 144 of FIG. 1B). As depicted at the bottom of FIG. 1B, the server/processing_circuit may route the incoming transaction to an agent, for example, via real or virtual system-based extension x1002, selected through the system's service-provided IVR experience.

Accordingly, with the example embodiment of the system shown in FIG. 1A, the related system depicted in FIG. 1B is able to facilitate an automated self-service experience for users by resolving inquiries discerned through the incoming interactions and/or effecting call-decision routing of incoming interactions to call-center agents or specialists, and this may be achieved by analyzing the incoming interactions and accessing possible associations relative to the information sets in the database, and/or other sources of information (and optionally, analysis).

In more specific examples and according to other aspects of the present disclosure, the UC-CC platform may process the incoming interactions in various ways and while making use of different resources (e.g., depending on the services linked to the respective incoming interactions and depending on aspects related to the call itself). The following explains some of these more specific examples, each of which is according to aspects of the present disclosure.

In connection with one such example aspect, the UC-CC platform is to read from the database to assess whether a selected one of the incoming interactions has source identification information associated with archived database information for indicating whether the selected one of the incoming interactions is to be routed, terminated or processed according to special instructions, and the UC-CC platform may write to the database to augment the database with information discerned from the inbound communication based on the source identification information and/or content deciphered from the inbound communication.

With regards to other example aspects, the UC-CC platform is to respond to a selected one of the incoming interactions: by iteratively accessing the database to assess for whether the selected one of the incoming interactions has archived associations stored therein and to augment the database with new associations generated in response to analyzing content from the selected one of the incoming interactions; and by, in sequence, assessing from the database whether the selected one of the incoming interactions has archived associations stored therein; assessing whether there is sufficient information in the database for the selected one of the incoming interactions to be routed, terminated or processed according to special instructions. Further, the UC-CC platform is to pursue may pursue at least one additional resource, according to client-specific profile data in the database, in attempt to gain more information for the selected one of the incoming interactions to be routed, terminated or processed specially based on said more information. The additional resource(s) may include a series of queries fed back to the initiator of the selected one of the incoming interactions, and wherein in response to the initiator answering one or more of the series of queries, the UC-CC platform augments the database with new associations generated in response the initiator answering one or more of the series of queries and/or trains AI/ML (artificial intelligence and/or machine learning) models to be use in processing subsequent incoming interactions.

In connection with yet further aspects, the UC-CC platform may respond to a selected one of the incoming interactions by performing an analysis on whether source information and/or content data warrants augmenting the database with newly-generated associations, and also may perform the analysis based on one or more confidence thresholds, corresponding to metrics or parameters provided by client entities, which indicate likelihoods that the newly-generated associations have sufficiently-high integrity.

In a more specific example, the UC-CC platform includes a computer-based database manager for managing access (reads, writes, refreshes, cache management, etc.) to the database which may be formed of different regions of memory circuitry and/or different memory circuits. In this context, database manager may act as an interface to various modules (e.g., programmed circuits) in the data-communication system which are to request access to the database for a selected one of the incoming interactions. As an example for use of the database manager in an integrated secure-access environment, the UC-CC platform accesses the database through an access pathway in which the database manager resides to respond to access requests from the UC-CC platform. In more specific examples of this type, the access pathway is situated so that access to the database does not traverse any broadband gateway circuit and does not traverse any security-based firewall circuit, and alternatively for permitting access over the broadband network while limiting exposure to unauthorized accesses, the access pathway is situated so that access to the database does not traverse more than one broadband gateway circuit and does not traverse more than one security-based firewall circuit.

In another related yet more-specific example, the UC-CC platform of one or more of the above data-communications systems accesses information regarding designated call-center agents and specialists which are stored in the database, and then routes the incoming interactions to the agents and/or specialists as may be appropriate given the particular details of the incoming interaction which are discerned by the UC-CC platform. In this regard, the UC-CC platform may also access the archived associations in the database for deciding whether to route respective ones of the incoming interactions to one or more of the designated call-center agents or one or more of the specialists having specific knowledge of subject matter discerned through the incoming interactions.

In certain situations, after a respective one of the incoming interactions is routed to a receiving party, whether one or more agents or one or more specialists or another party, the UC-CC platform may permit the initiating/receiving party of the incoming interaction to select a bridging option for causing a selected party to be bridged and joined into the incoming interaction and this bridging could be to anywhere inside or outside the system or client entity related to the incoming interaction. Further, in response to the selected party being bridged and joined into the current (e.g., live) incoming interaction, the UC-CC platform may archive information to associate the call and the bridging into the database for use in a subsequent one of the incoming interactions. Also, according to another aspect which may optionally be part of the automated self-service experience, the UC-CC platform may access the database for the subsequent one of the incoming interactions and in response to finding corresponding parameters for the incoming interaction, may cause the subsequent one of the incoming interactions to automatically bridge, or offer as an option to bridge, one or more agents and/or one or more specialists into the subsequent one of the incoming interactions.

As other aspects related to the above data-communications systems, the UC-CC platform may access the database for content in a selected one of the incoming interactions which content indicates whether to bridge a manager affiliated with an account, into the selected one of the incoming interactions. The affiliated manager may be identified by source information for the selected one of the incoming interactions and/or by associations stored in the database. Also, the UC-CC platform may bridge to such a manager into the selected one of the incoming interactions in response to discerning one or more of: keywords, context, intonation, and speech characteristics, and the UC-CC platform may discern, in response to the accessing of the database for a selected one of the incoming interactions, whether to offer an entity affiliated with the selected one of the incoming interactions, one or more data-communications services and/or data analytics packages through which the user or affiliated client entity might gain access to metrics, outcomes and certain AI/ML models which are part of or being generated by the system. The database may also include representations of digital voice data associated with transcribed audio conversations which correspond to one or more of the incoming interactions, and may further include geographic information and/or calendar information provided by or associated with the one or more of the incoming interactions, wherein the representations of digital voice data include keywords and speech characteristic parameters associated with outcomes of or with contexts relating to the transcribed audio conversations.

In another example aspect, the UC-CC platform may affect the call-decision routing of the incoming interactions to the above-mentioned designated call-center agents or specialists based on a time-based assessment of whether the designated call-center agents or specialists are able to handle the routing of the incoming interactions. Such assessments of whether the designated call-center agents or specialists are able to handle the routing of the incoming interactions may be performed by predictive analysis, models and related system data.

Depending on the application, it will be appreciated that the UC-CC platform can be implemented to include a cloud-based set of data/call centers, at least one of which includes a plurality of data-communications servers respectively located in different physical locations, and that the UC-CC platform can include physically-separated virtual servers and/or circuit-based modules that are configured to work together so that they collectively function as a single unified server having integrated read and write access to the database without having to pass through a gateway of $3^{rd}$ party entity (e.g., which is disparately managed relative to the service provider on behalf of the UC-CC platform). Also, such physically-separated virtual servers and/or circuit-based modules of the UC-CC platform may be configured and integrated for access to the database without having to pass through disparately-managed security-screening filters.

Figure 1C:
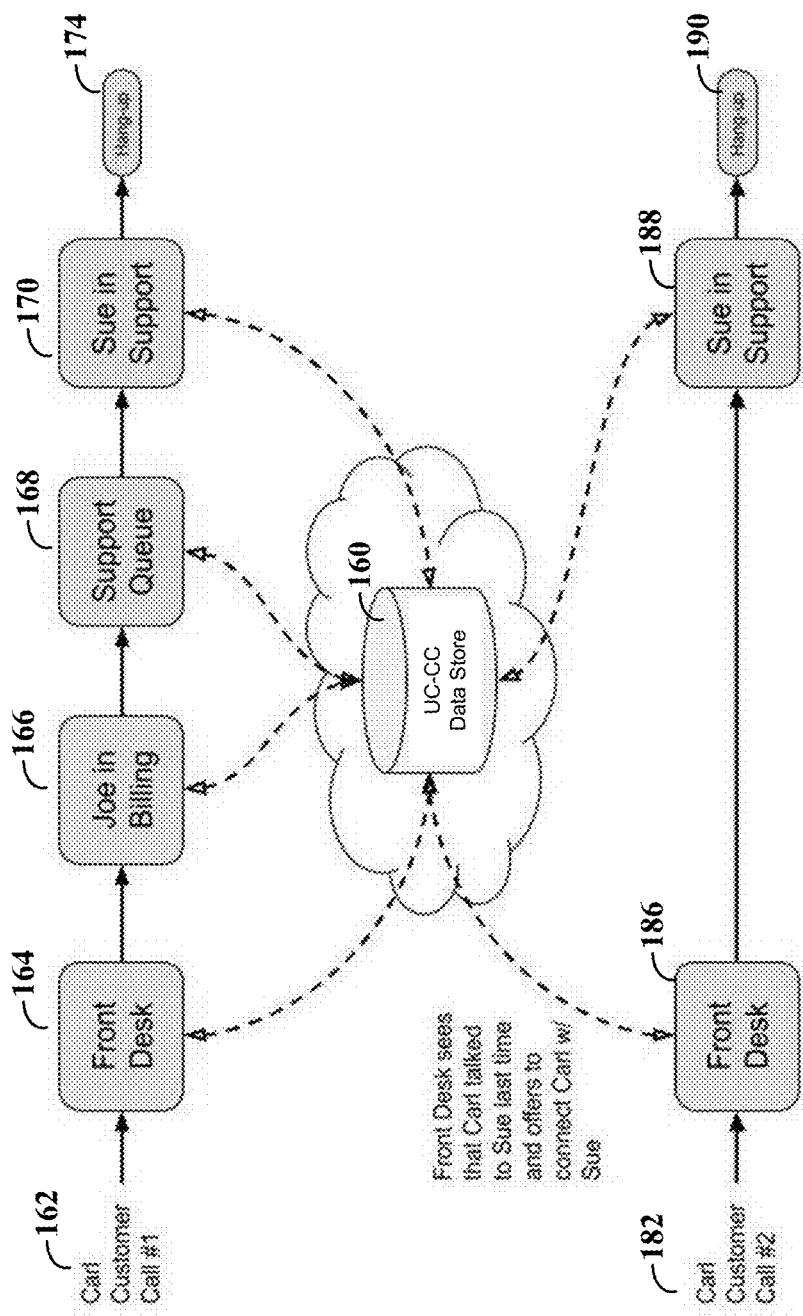
FIG. 1C is an example data-flow diagram that may be implemented by one or more of the communications system depicted through FIGS. 1A and 1B.

In accordance with the present disclosure, FIG. 1C provides a simple example of how an incoming interaction may be processed via a generalized data-flow diagram. The data-flow diagram shows one of many ways for how such an incoming interaction may be received and processed by one or more of the above-disclosed example data-communications systems (e.g., the UC-CC platform of FIG. 1A or FIG. 1B). FIG. 1C shows two processing pathways respectively illustrating what happens through two incoming interactions from the same initiator, in this example, the two incoming interactions being from Carl, a customer who calls in twice. Carl's first call starts at circuit-based block 162 and flows along a pathway including circuit-based blocks: front desk 164, billing 166, support queue 168, agent/specialist 170 and confirmation of (optionally with feedback to database 101 after) call-termination 174. Carl is transferred by the front desk 164 to Joe at billing 166. Billing 166 informs Carl that he really needs to talk to support personnel and hence, Joe at billing 166 transfers Carl into the support queue 170 where Sue answers. Sue is very helpful and resolves Carl's initial challenge involving his first call starting at block 162.

This processing of Carl's call (the first and/or second call) may or may not involve live communications with one or more humans who go by names Joe and Sue, and in the case of a human, Joe and/or Sue may be live agents or experts to which Carl's first and/or second calls may be transferred after discerning a likelihood that his/her assistance is appropriate.

Further, based on said one or a combination of two or more of the blocks 164, 166, 169 and 170, the platform (or processing circuit) generates further associations for storage in information sets as discussed in connection with FIG. 1A the data store or database with each such information set being linked, for example, to Carl via contact information for Carl), Carl's call-in device (e.g., CPU or smartphone), a client entity associated with Carl or his call-in device, and/or context discerned in connection with Carl's incoming interaction.

Continuing with this example, four months later, Carl has slept a few times and calls back in not remembering who he talked to but remembering things worked out well last time. This second call starts at circuit-based-block 182 and flows along a pathway including circuit-based blocks front desk 186 (the same or different via a virtual front desk than front desk 164) and support queue 188 (the same or different via a virtual support queue than support queue 168), with block 190 corresponding to confirmation (optionally with feedback to database 101) of call-termination 174. Again, each of these blocks may or may not involve live communications with one or more humans. Accordingly, in this second call, the call from Carl is received by the front desk 186, which is prompted that "hey, the last time Carl called in, he talked to Sue, and our analysis of the call is that it went well". This may occur with access to the (e.g., analyzed via analytics circuitry in FIG. 1A or 1B). So the front desk transfers the call promptly to Sue based on an access via the front desk 186 to relevant data in the data store 160 and possibly with Sue at block 188 again accessing relevant data in the data store 160.

Accordingly, for this second call, Carl's experience and resolution of Carl's challenge is based on one or more accesses to relevant data in the data store 160 (e.g., via the associations in information sets discussed in connection with FIG. 1A in the data store or database 101) by any one or a combination of two or more of the blocks 164, 166, 169 and 170.

Figure 2:
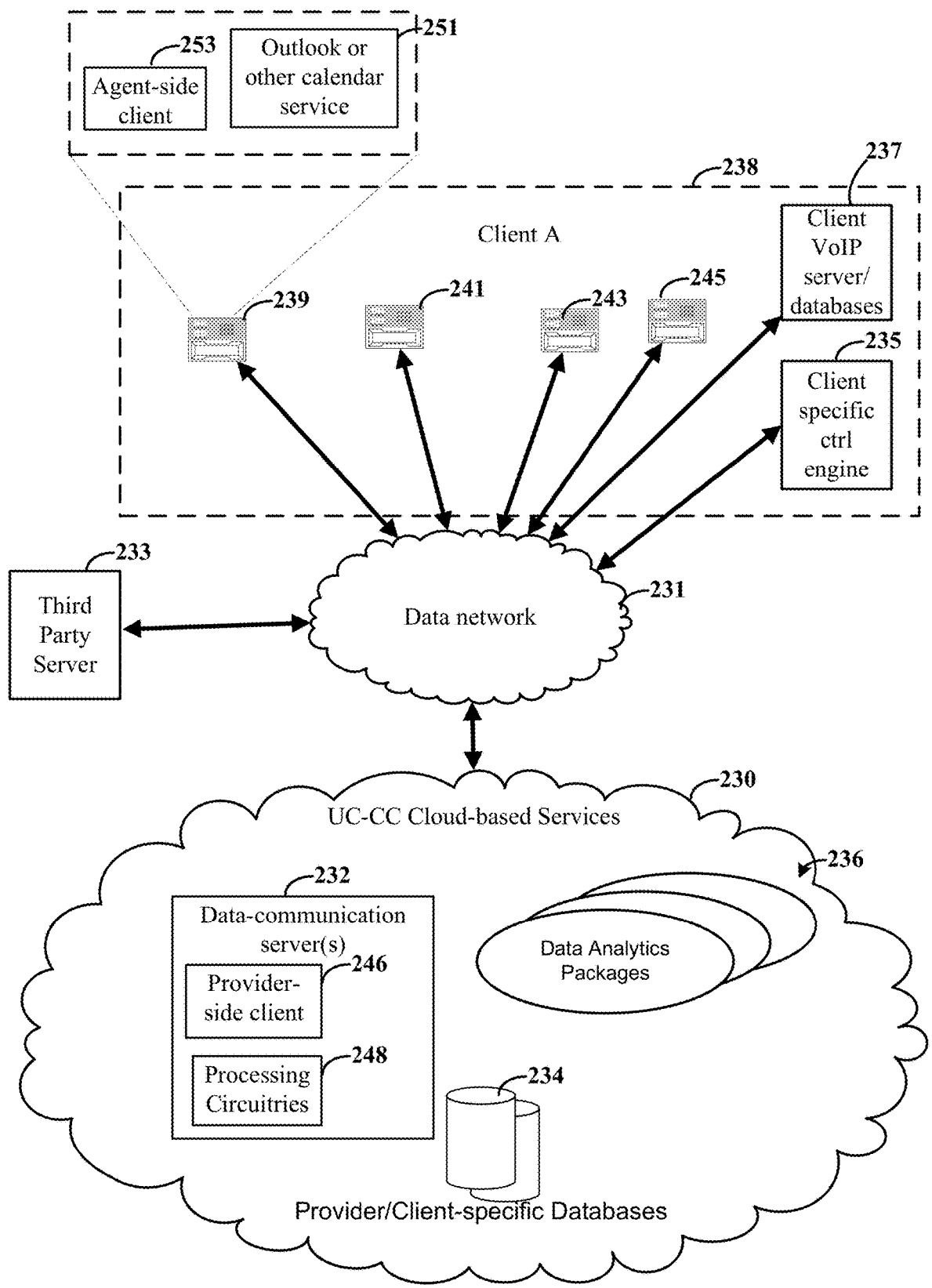
FIG. 2 illustrates another example data-communications system having aspects consistent with each of the above-illustrated example embodiments of the present disclosure.

FIG. 2 shows yet another example data-communications system with circuit-based modules highlighted to illustrate one way for how a UC-CC platform/server via cloud-based services 230 detailed to show one or more data-communications servers 232 (having provider-side client circuits 246 and processing circuitry 248), provider/client-specific databases 234 (e.g., as being within the database 101 of FIG. 1A), and data analytics packages 236 which may be subscribed to and/or accessed by selected client entities to which the platform provides data communications services.

In connection with the specifically-illustrated example of FIG. 2, endpoint devices 239, 241, 243, 245 connected in a data network 231 are configured to place and receive VoIP telephone calls between other VoIP endpoint devices, and/or between non-VoIP endpoint devices, although embodiments are not limited to VoIP communications systems. Non-VoIP endpoint devices can include, for example, plain old telephone service (POTS) telephones and cellular-capable devices, which might also be VoIP capable (e.g., smart phones with appropriate VoIP software applications). The various endpoint devices 239, 241, 243, 245 are associated with an account 238 of a client, e.g., Client A, and include circuitry that is specially configured to provide calling functions that include interfacing with the appropriate circuitry of the call service provider used by the corresponding endpoint device. In many contexts, a VoIP endpoint device is a VoIP-capable telephone commonly referred to as IP phones. The VoIP endpoint devices 239, 241, 243, 245 can include, but are not limited to, desktop computers, mobile (smart) phones, laptop computers, and tablets, such as illustrated by 240, 242, 244. When each of the endpoint devices originates or receives a call in a telephone network, each can be characterized or referred to as an addressable call endpoint or a dial peer. The client can have or be associated with one or more client databases 237 for storing various data and a client specific control engine 235.

The data (e.g., call) routing and other services for the VoIP telephone calls can be provided by one or more data-communications servers 232 within a UC-CC services system 230 which may be cloud-based as depicted in the example illustration of FIG. 2 (e.g., configured to provide a PaaS to customers of the VoIP provider). In particular example embodiments, the data-communications servers 232 can be located within platform as a service (PaaS) computing servers, which are part of the UC-CC services system 230. The UC-CC services system 230 also includes one or more provider hosted client-specific control engines 235. A client-specific control engine can also be implemented locally by a client (e.g., 246). In some embodiments, data centers can be part of a cloud-based system where the hardware providing the cloud services is located in a number of different data centers with different physical locations. Consistent with embodiments, the cloud services can include session initiation protocol (SIP) servers, media servers, and servers providing other services to both VoIP endpoint devices and the users of the VoIP endpoint devices. In some instances, the various servers, including both the data-communications servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified UC-CC server.

A particular example of a data-communications server which uses Session Initiation Protocol (SIP) to handle various call functions (e.g., call setup and tear down); however, the various embodiments discussed herein are not necessarily limited thereto. Consistent with the above and other embodiments disclosed herein, the data-communication servers are VoIP communications servers that are configured to establish a leg of the call from the VoIP endpoint devices (or dial peers) to another VoIP endpoint device, or to a gateway.

According to various embodiments, one or more data-communications servers 232 can monitor and analyze call data relating to digital call data of calls occurring using the VoIP endpoint devices 239, 241, 243, 245 via processing circuitry 248. For example, a data-communications server (in the UC-CC platform as with FIG. 1A) can be designed to receive digital voice data, such as directly from an agent-side client associated with particular endpoint devices. The agent-side client can communicate the audio or the digital voice data to the provider-side client. The provider-side client then provides the audio or digital voice data to processing circuitry 248 which may include analytics and decision-routing circuitries (e.g., as shown in FIG. 1A) and in certain more specific examples may include processing/communications circuitry internal and/or external to the data-communications system for further analysis, such as transcribing to digital voice data, identifying keywords and/or speech characteristic parameters, identifying an outcome, and providing an association between the keywords and/or speech characteristic parameter using the identified outcome. The association can be stored in an archive in provider-side and/or client-specific database(s) 234. In some specific embodiments, new keywords and/or parameter values are identified as having an association with an outcome. In other embodiments and/or in addition, a stronger correlation (e.g., probability) between the keywords and/or parameters is provided over time responsive to multiple verifications of an association. For example, a script running the data-communications server 232 can parse call digital call data and stored association to generate database queries that direct the data-communications server to provide a new association and/or update an existing association. The script can use the information to generate a report that can be used for training, promotions, and/or other analysis of agents. According to various embodiments, the database queries can be sent to a customer database 237. The feedback can be provided in real time or near real time to the endpoint device of the agent and/or can be accessed by a manager.

Consistent with certain embodiments, the data-communications server 232 can be configured to interface with a third party server 233 such as a customer server, or other third party servers. For instance, a CPXML document stored by the data network 231 can identify, based upon a received call, a Uniform Resource Identifier (URI) that points to customer servers, or to other third party servers.

The one or more data-communications servers 232 monitor and analyze call data relating to digital call data of calls occurring using the VoIP endpoint devices 239, 241, 243, 245 can further analyze such assessment for different customers over many entities and can provide the same as data analytic packages 236 via the processing circuitry 248. The packages 236 can be provided as a service to entities and can be based on geographic regions, markets, and type of customers. In specific embodiments, the packages 236 can be provided as a service and can be used for training agents for providing better customer interactions, such as suggested phrasing and words that result in particular outcomes and/or outcomes that are efficient. The packages 236 can be based on various customer-interaction metrics used to analyze the quality of calls.

As an example, the data analytics packages 236 can be offered as a cloud-based service to an entity to use for training purposes and/or otherwise improve or monitor customer interactions by agents. In some instances, the cloud based services can include automatic antitrust blockers. For example, the data service provider can have data blockers which can automatically block particular data provides as part of the data analytics packages 236 to particular entities based on antitrust concerns or privacy for other entities. Example feedback can include outputting a phrase to say during a live audio conversation to an endpoint device currently in use by the agent for the live audio conversation between the agent and the customer, outputting the phrase provided as data for display on user display of the endpoint device and/or audio provided to a speaker of the endpoint device, a customer feedback report using the associations indicative negative and positive outcomes and associated keywords and/or speech characteristic parameters associations.

In various embodiments, the above-exemplified data-communication systems can be used to make data routing decisions for incoming interactions based on data across the UC-CC platform as well as one or more other platforms. The routing decisions, in some specific embodiments, are based on a predicted inability to handle a volume of incoming data communications, such as calls, although embodiments are not so limited and can include rerouting responsive to other indications (such as region or branch of a client entity having negative customer interactions or other rational). The decision can be made based on data obtained from endpoint devices of agents, data-communications server(s) operated by the provider, and/or data-communications server operated by the client. In some embodiments, the prediction can be based on geography, system updates, schedules and keywords, and which include unification between platforms of the data-communications system to provide better routing decisions. In a number of embodiments, the call traffic can be rerouted based on analysis of digital voice data.

The UC-CC platform can include the use of Outlook on the agent's endpoint device(s) to identify schedules, data from the client data-communication (e.g., VoIP) server to identify scheduled system updates and/or other system level issues, and digital voice data analyzed to identify when to reroute traffic, as well as other data such as data obtained from a search engine. The digital voice data may be used to identify an agent that is leaving when not scheduled to, or that may be otherwise unable to take telephone calls. As an example, one or more agents may unexpectedly be unable to answer phone calls due to illness, weather or other catastrophes of the geographic region, family issues, unplanned work meetings, among other reasons. In some specific embodiments, an event can occur that may impact a variety of agents located at different geographic locations. The unification of the different platforms can be used to identify patterns, such as particular events that different classification of agents (e.g., age, sex, geography, and other demographics) are more likely to be impacted by. As a specific example, agents that are between the ages of 18-25 may be more likely to ask for vacation time during the spring (e.g., Spring break). Additionally, agents that are known to have children may be more likely to ask for vacation time during Spring break of their children's school. As another specific example, patterns of a specific agent may be identified, such as common vacation requests (e.g., after or before a particular sports team has a game, during a political campaign, specific religious holidays, weather etc.).

Such situations may be identified based on keywords and may be associated with being out of the office or unable to answer calls (as an outcome in the archive). In addition to using the digital voice data to predict volume of calls that can be handled, the digital voice data can be used to make decisions of where to reroute the calls to. For example, calls can be rerouted to a region with similar types of keywords or speech characteristics and/or to particular agents that have experiences with the same type of customers.

In specific embodiment, the analysis can include artificial intelligence used to predict a call answer rate of an entity and/or specific regions of the entity. The call answer rate can be based on general trends over time, such as identified patterns of agents in response to different events and/or situations. The patterns can be specific to an agent, e.g., Agent A takes time off when it snows more than three inches, and/or specific to a region, e.g., a particular region has 20% of agents unable to answer calls after it snows or rains more than three inches. Such patterns can be based on weather, local events (e.g., sporting events, political events, school calendar, such as scheduled days off, fundraisers and other), non-local events (e.g., national sporting events, religious holidays, general time of year) illness or other health related trends. As an example, a first entity may allow their agents to work remotely from home and a second entity may not. The second entity may be more greatly impacted by weather related events (e.g., more agents cannot make it to work and thus cannot answer calls) than the first entity. Such trends may be different for different locations and different demographic groups of agents. For example, agents of a particular age may be more likely to be unable to answer calls after a local sporting events than other agents, although embodiments are not so limited.

As described above, the data-communications system illustrated by FIG. 2 can be used to predict an ability to handle call volume, in accordance with various embodiments. The routing decisions can be made by one or more of the data-communications servers 232 based on a prediction of call volume that can be handled by agents of the entity. The predicted call volume can be determined using processing circuitry 248 and based on integration of data across a plurality of platforms, such as agent's machines (Outlook 651 to identify schedules), client data-communications server 237 (identify updates on server/system or other system level issues), and provider data-communications server 232 (including the previously described digital voice data and analytics of data to identify/predict when calls cannot be made), as well as other sources (e.g., Internet-based data). The processing circuitry 248 can analyze data identifying schedules of agents, updates to the server or system, system level issues, and predictions of when agents may be available and/or how long calls may take based on archived data stored in the provider-side and/or client-specific database(s).

As previously described, the one or more data-communications servers 232 can monitor and analyze call data relating to digital call data of calls occurring using the endpoint devices 239, 241, 243, 245 and the processing circuitry 238. For example, a data-communications servers 232 can be designed to receive digital voice data, such as directly from an agent-side client (e.g., agent-side client 253) associated with particular endpoint devices and provide the same to the processing circuitry 248. The processing circuitry 248, although illustrated as a component of the data-communications server 232, can be external to the server 232 in various embodiments. The agent-side client 253 can communicate the audio or the digital voice data to the provider-side client 246. The provider-side client 246 may then provide the audio or digital voice data to the processing circuitry 248 for further analysis, such as transcribing to digital voice data, identifying keywords and/or speech characteristic parameters, identifying an outcome, and providing an association between the keywords and/or speech characteristic parameter using the identified outcome. The association can be stored in an archive in one or more provider-side and/or client-specific databases 234. In some instances, new keywords and/or parameter values are identified as having an association with an outcome. In other embodiments and/or in addition, a stronger correlation (e.g., probability) between the keywords and/or parameters is provided over time responsive to multiple verifications of an association. For example, a script running the data-communications server 232 can parse call digital call data and stored association to generate database queries that direct the data-communications server 232 to provide a new association and/or update an existing association. The script can use the information to generate a report that can be used for training, promotions, and other analysis of agents. According to various embodiments, the database queries could be sent to a customer database and/or another third party server 233. The feedback can be provided in real time or near real time to the endpoint device of the agent and/or can be accessed by a manager.

In some instances, the analysis by the processing circuitry 248 can include predicting whether (e.g., based on a call volume) various agents can handle routing of can be used for routing decisions. The call volume predicted can be based on the data analytics packages 236 and/or archived data in the provider-side and/or client-specific database(s) 234 such as identification of average call times, which can be different for different types of customers, and for the respective agents, types of calls or customers predicted to be calling (e.g., average for time of year and geographic location as an example), prediction of system level issues and predicted agents that are available to receive calls. The prediction of agents can be based on data from the agent's machine(s), such as Outlook or other calendar services or applications 251, or within the provider-side and/or client-specific database(s) 234 or as part of a data analytics package 236. For example, the digital voice data from a particular agent may include identification of a time the agent will not be available (has another call, a meeting, etc.). As another example, the data analytics package 236 may include identification of types of agents that may be unavailable in response to different events or times of the year (e.g., Spring break time, particular holidays, sporting events, natural disasters etc.) and/or based on general trends across the entity and/or a particular region of the entity.

Additionally, decisions on where to reroute the calls to can be based on the previously described data analytics. For example, customers from the Southern region of the United States may respond better to different speech characteristics than customers from the Northeast region of the United States. Such associations may be determined over time and using the provider-side and/or client-specific database(s) 234 to capture the digital voice data associations, and may be across different entities, and can be used to make decisions on where to reroute calls to. Such rerouting decision may be performed with or without the call volume predictions.

In response to a client not having such a service, the processing circuitry 248 can predict a call volume that can be handled is less than a predicted incoming call volume and communicate the same to the data-communications server 232. The data-communications server 232 can offer the rerouting as a service to the client.

Figure 3A:
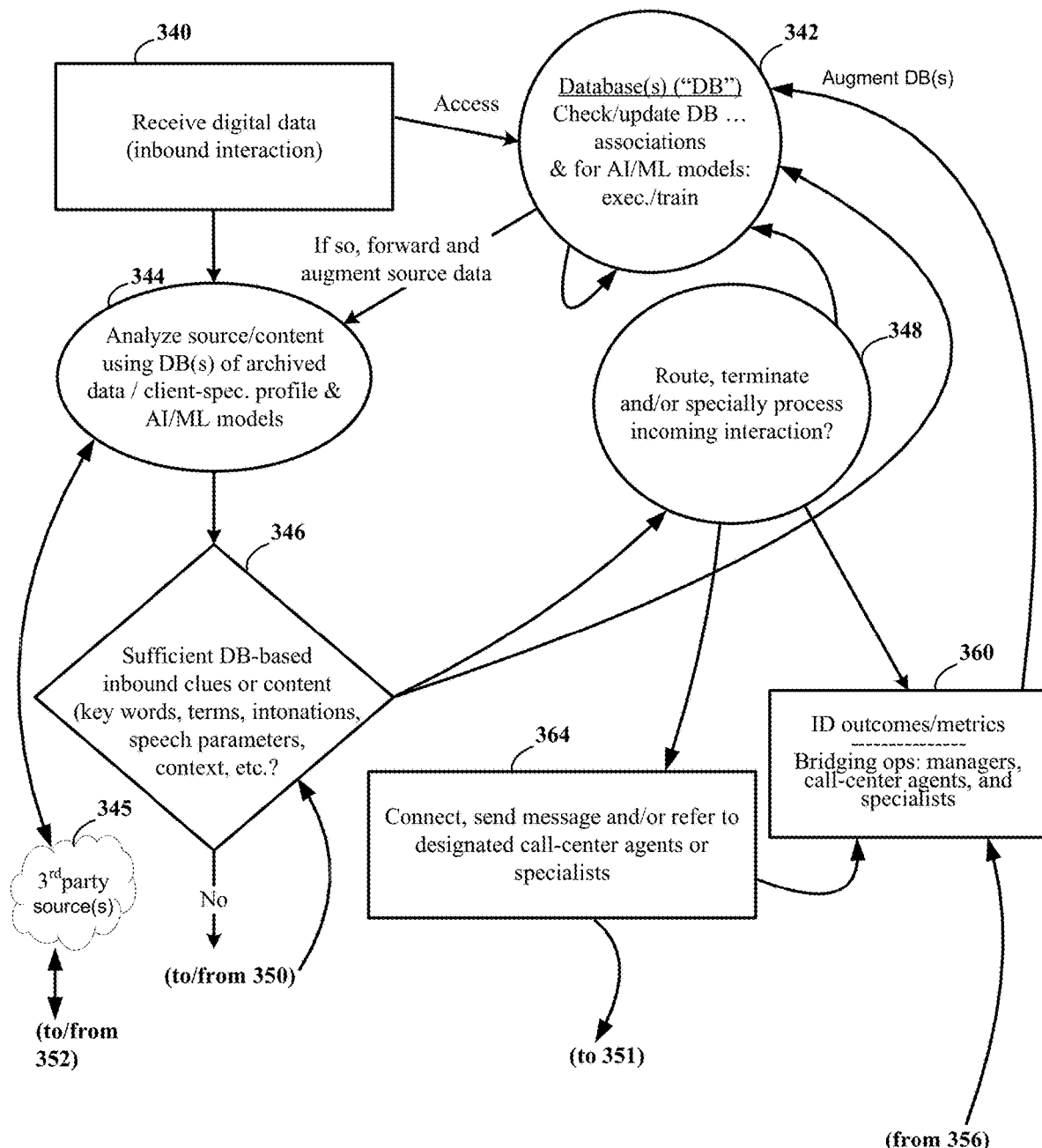
FIGS. 3A and 3B (sometimes collectively as FIG. 3) illustrates exemplary aspects, shown collectively and illustrated as an overall data-flow diagram, for use in connection with various methods for using data-communications systems and components according to the present disclosure.
Figure 3B:
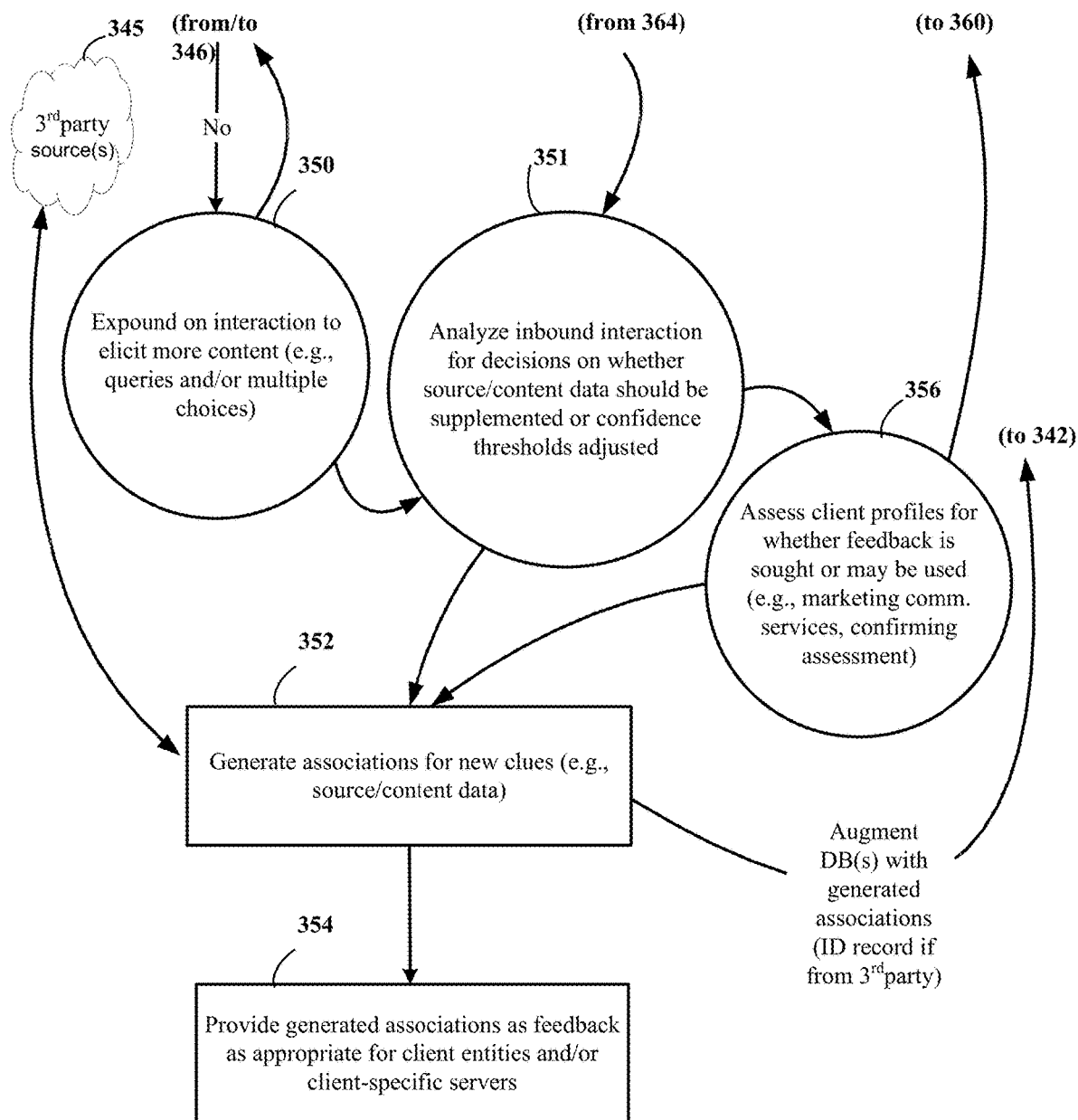

FIG. 3 (via separated diagrams FIGS. 3A and 3B) illustrates an example method showing how one or more of many aspects available to an example data-communications system, in accordance with various embodiments of the present disclosure, may be implemented. In some instances, although the system and related examples are not necessarily so limited, the following discussion of FIG. 3 assumes that the incoming interaction may involve audio (and/or one or more other forms of digital data) and the system can use aspects of the audio (transcribed speech, voice/video data, intonations, context terms, etc.) for analyzing incoming interactions and/or providing feedback on such analyses as part of one or more of the data-communications services. Further, an understanding of the exemplary the flow of FIG. 3 may be more readily appreciated with reference to the above provided discussion in connection with FIG. 1A, where the UC-CC platform 110 performs each of the activities depicted in FIG. 3 unless otherwise indicated/apparent.

The flow begins at block 340, where an incoming interaction is received at processing circuitry of the platform in the form of digital data, for example, which may be indicative of call such from Carl as in FIG. 1C. Also, the call may be an audio conversation between a plurality of agents and customers of a remotely-situated client entity. The digital data can be voice data transcribed from audio by the endpoint device of the agents and communicated to the processing circuitry and/or the data-communications server via clients on the agent and provide side. In other embodiments, a client server can transcribe the digital voice data and communicate the same to the data-communications server and/or the data-communications server can transcribe communicated audio waves.

At 342, the database may be accessed where associations in connection with one or more information sets are checked and/or updated relative to inbound-source and content data (location, caller ID, call-device ID, etc.). At 344, the digital voice data can be analyzed, via the processing circuitry, for example, also using the database again such as a database of archived data including associations of keywords and/or speech characteristic parameters and outcomes, and/or also using AI/ML trained models. The digital voice data can be analyzed to identify keywords and speech characteristic parameters of the digital voice data, identify outcomes of the respective transcribed audio conversations, generate associations with at least one of the keywords and speech characteristic parameters with the identified outcomes, and/or providing the associations to a client data-communications server as feedback on audio conversations with the customers.

For example, at 344, the digital voice data is analyzed and used to identify keywords and speech characteristic parameters of the digital voice data and compare the identified keywords and parameters to a database. The database has stored correlations or associations of keywords and parameters to tones or sentiments of a conversation and outcomes of the conversations. The associations or correlations can include a probability of the match indicating the outcome. In response to a match, at 346, the correlated archived outcomes is identified. In response to no match and/or in addition (can have matching and nonmatching keywords), at 350, the analysis effort may be expanded such as by identifying other associations based on new keywords, contexts, etc. At 350, the outcome of the respective transcribed audio conversation can be identified, and flow may return to block 346 to assess a match once again.

The outcome, as may be identified based on a match, a respective correlation and/or based on analysis of metadata in the digital voice data, may lead to block 351 and possibly 356, where the inbound interaction may be analyzed for deciding on whether source/content data should be supplemented or confidence thresholds adjusted, and this effort may involve reviewing relevant client profiles (e.g., stored in the database) to discern particular instances in which to perform such adjustments, identify outcomes for metrics to be stored, used and reported, and/or bridge certain agents as at 360 and as in FIG. 1C. From block 352, such newly generated associations are used to augment the database (at block 342) and to provide feedback for certain client entities (e.g., as may be appropriate via the relevant client or client-entity profile in the database(s). Also, a bridge agent can enter metadata that is correlated with the digital voice data and/or that otherwise ties to the transcript, and the metadata can identify the outcome, be used in training AI/ML model(s), and/or be used in augmenting the database and in generating one or more new associations for the database.

Further, as depicted from blocks 342 and 352, flow may proceed to block 345 over a pathway (e.g., via a gateway) where information from a $3^{rd}$ party source may be requested and/or retrieve for answering a challenge in the inbound interaction, supplementing the database with newly generated associations, and/or further training the AI/ML models used by the platform.

Once sufficient analysis is realized, platform may route the incoming interaction (block 348) as previously discussed and cause: the call to be connected to one or more designated call-center agents or specialists; a message to be sent to one or more designated call-center agents or specialists; and/or one or more designated call-center agents or specialists to be referred to an initiator/challenger of the incoming interaction.

As noted, the use of the archived database, in various embodiments, can include performing artificial intelligence (AI/ML) to determine the outcome. The processing circuitry and/or data-communications server can analyze patterns to identify and associate different keywords, phrases, and/or speech characteristic parameters with particular outcomes, and which can be different for different types of customers (e.g., different geographic regions, fields, sexes, ages, and other categorizations). The processing circuitry and/or data-communications server can analyze resulting data to determine the outcome, such as identifying a sale, retention of a customer, hang-up, loss of a customer, resolution of a problem, which can include a specific and identified problem or a general problem, among other outcomes. Overtime, the processing circuitry and/or data-communications server can update the database based on additional digital voice data. For example, at 352, the method includes generating associations with at least one of the keywords and speech characteristic parameters with the identified outcomes and storing the associations in information sets relevant to one or more incoming interactions related to the present incoming interaction. The associations can include new keywords that are associated with particular outcomes, new outcomes, and increasing or decreasing a correlation of keywords or parameters with an outcome. For more general information on artificial intelligence and specific information on achieving artificial intelligence, reference to made to U.S. Publication No. 2004/0143559, filed on Jan. 13, 2004, entitled "System and Method for Developing Artificial Intelligence," and U.S. Pat. No. 5,473,732 filed on Feb. 7, 1995, entitled "Relational Artificial Intelligence System," each of which are fully incorporated herein for their teachings.

In specific embodiments, the associations can be classified differently for different types of customers. For example, the processing circuitry can provide different associations based on characteristics of the particular audio conversations, including characteristics selected from the group consisting of: geographic region of the customer, sex of the customer, age of the customer, type of customer, and a combination thereof. The associations are stored in the provider database as an archive that is accessible and that ties the keywords with dates of the conversations and the classifications, and which identifies keywords and phrases to avoid for particular types of customers and keywords and phrases to use for the particular types of customers.

As a specific example, and not intended to be limiting, a first region can include a Northeastern region of the United States and a second region can include a Southern region of the United states. It may be identified that customers from the first region speak at a greater frequency and amplitude than customers from the second region. As another example, it may be identified that women speak at a lower amplitude than men. A third region can include Southern Pacific Coast of the United States (e.g., parts of California) which may include customers that speak at a similar frequency and amplitude as customers from the first region. However, embodiments are not so limited and the above is provided only as an illustrative example. Additionally each of the about may have specific words and phrases to avoid, as they have a greater probability then other words at causing a positive or negative outcome. As a specific example, the second region may have a positive outcome associated with calling the customer "Miss" or "Mr." whereas customers from the third region may have negative outcome associated with the same or may have a greater probability of a positive outcome when addressing customers by their first name.

In various embodiments, feedback can be provided. For example, at 354, the method further includes providing the associations to a client data-communications server as feedback on audio conversations with the customers. The feedback can be provided to the agent in real time and used by the agent to assist in achieving a positive outcome or to otherwise adjust an outcome of the conversation. In other embodiments, the feedback can be provided after the call is finished and used to train the user. For example, the feedback can be used to train the user in how to handle different situations. In some instances, a report is generated that can be reviewed by a manager, as previous described. Further, in specific embodiments, a manager can be automatically bridged into a VoIP call responsive to particular keywords (e.g., swearing), based on the specific customer, and/or speech characteristics parameters outside a threshold. In such a manner, the feedback can include or otherwise be indicative of customer feedback which is provided to the client entity without actively querying the customer, such as with the customer actively providing answers to a questionnaire.

In a number of related embodiments, the associations between keywords and/or speech characteristic parameters can be adjusted over time. The adjustment can be responsive to different outcomes or input from the agent or other users. For example, the processing circuitry can provide a respective association with at least one of the keywords and speech characteristics with the identified outcome to an agent associated with the audio conversation or a manager associated with the agent. In a number of embodiments, the associations can be locked and a manager reviews the recommended adjustments (by the agent) and approves or denies the adjustment. In response to the agent or manager providing an input indicating the associated is incorrect, the association is adjusted. In other embodiments and/or in addition, the association can be stored in response to the agent or manager providing an indication indicating that the association is correct or not providing any indication within a threshold period of time.

Figure 4:
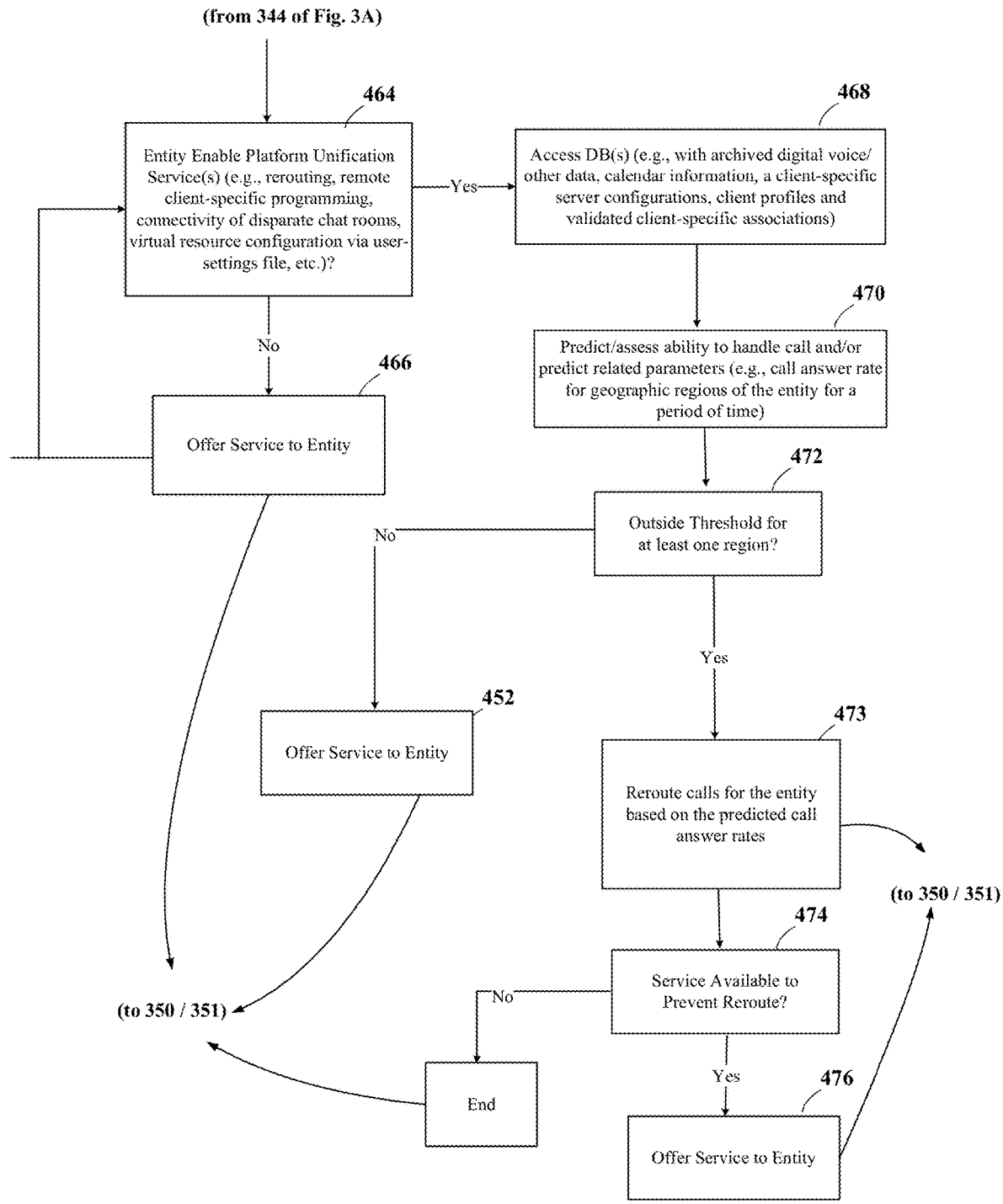
FIG. 4 illustrates an example method for use in a data-communications system, related to aspects of the example data-flow diagram shown in FIGS. 3A and 3B and also consistent with the present disclosure.

FIG. 4 illustrates an example method for extending use of the exemplary types of data-communications system as disclosed in connection with FIGS. 1A, 1B, 1C, 2 and 3, also in accordance with various embodiments of the present disclosure. As shown in FIG. 4, the methodology may be used to analyze and predict an ability for certain transferees of routed calls to handle such calls, as discussed above, whether each such transferee may be an entity and/or a subset of agents of entity and based on the analysis or prediction, decisions are made on whether to route the calls.

From block 344 of FIG. 3, flow proceeds to block 464 of FIG. 4, where a determination is made as to whether the entity has enabled a platform unification rerouting service. The platform unification rerouting service can include the prediction of the call volume that can be handled (e.g., processed by agents or a subgroup of agents) and rerouting based on the same. The predicted call volume and determination of rerouting can occur via access of a variety of data across multiple platforms. For example, the platforms can include the provider database, the remotely-situation client entities, data analysis package services, a client (VoIP) server, and a third party server, among other resources such as the Internet. In response to determining the client has not enabled the service, the service can be offered to the client at 466.

In response to determining the service is enabled at 464, the data-communications server of the UC-CC platform can access the database as well as other platforms, at 468 as previously described. For example, the data-communications server can access calendar information for agents the least one of the plurality of remotely-situated client entities (e.g., access the endpoint devices for calendar information), and a client (VoIP) server for geographic information of the agents and system parameters of the remotely-situated client entity. Such data can be combined with the archived digital voice data of agents of the entity, as well as other types of data, and analyzed to predict a call answer rate for particular agents of a geographic region of the entity for a period of time, at 470. The predicted call answer rate may be below or above a normal threshold and/or below a predicted call rate (e.g., how many calls will be made that agents are to answer). In other embodiments and/or in addition, during real time, the actual call threshold, e.g., call made to agents in the region, can be greater than the predicted call answer rate. In response to a determination on the prediction issue, the process may end or the processing circuitry and data-communications server may use the data analyzed to offer other services to the entity at 452 such as data analytics packages, feedback on customer interactions. Offering such other services may also occur in connection with block 466 and/or block 476.

In some specific embodiments, at 472 the processing circuitry can predict (or the actual can be) the call answer rate for particular agents of the geographic location to be below a threshold responsive to identifying greater than a threshold number of agents are out of the office for the period of time, trigger words in the archived digital voice data indicative of illness, weather, catastrophes associated with the geographic region and the period of time, system parameters indicating schedule outages or system updates for the period of time, and/or indications of a likely increase in calls (e.g., weather events may indicate increase calls for an automobile and home insurance company). For example, the processing circuitry can predict the call answer rate for particular agents by weighing each of the information identified from the archived digital voice data, the calendar information, and the system parameters.

As a specific example, the processing circuitry can predict the call answer rate for particular agents of the geographic location to be outside threshold responsive to identifying less than a threshold number of agents are out of the office for the period of time, trigger words in the archived digital voice data indicative of increased productivity during the period of time; and/or system parameters indicating increased productivity for the period of time. In some embodiments, an increasing number of incoming calls can be rerouting to the geographic region in response to the prediction. For example, the analysis may indicate that the particular agents can handle a higher volume of calls than are being routed. In other instances, the analysis may identify that the particular agents can handle a lower volume of calls than are being routed.

If permissible and appropriate, the call is then routed as at 473. For example, in response to the prediction(s) for particular agents for a period of time being outside a threshold, such as being less than an actual call in rate or a predicted time for answer calls in the period of time, at 473, the calls can be rerouted, by the data-communications server, for the remotely-situated client entity based on the predicted call answer rate. The rerouting of the incoming calls can further include providing an indication of the rerouting to an identified personnel of the client entity as identified from the client data-communications server, and rerouting in response to verification received from the identified personnel (allow for feedback/don't auto reroute).

As another specific example, the processing circuitry can analyze the archive of digital voice data indicative of transcribed audio conversations as in the database with the corresponding information sets between the plurality of agents and customers to identify keywords and speech characteristic parameters associated with the customers and the outcomes of the transcribed audio conversations. The server may then make the prediction (e.g., the call answer rate) for particular agents based on identified keywords and outcomes of the transcribed audio calls associated with the particular agents (e.g., have better success, can have better outcomes for particular customers). The processing circuitry may also provide a weight of the identified information and sum the weights, wherein a respective summed weights outside a threshold indicates rerouting of calls for the respective geographic region.

In some embodiments, the processing circuitry can identify if there is a service available to prevent the rerouting in the future for the client at 474. Such a service can include additional server resources, server updates, etc. In response to determining a service is available, at 476, the service is offered to the client. If no service is available, the process can end. As a specific example, feedback can be provided to an identified personnel responsive to the rerouting, the feedback including a service provided by the data-communications server that increases a call rate of the geographic region (e.g., provide backup server that would have prevented a decrease in call rate).

According to certain implementations and applications, one or more of the above-disclosed example aspects and/or embodiments may be beneficial to CPU-based system operations as provided by at least one, if not multiple points, as follows. Such a UC-CC communications-service platform is able to provide: AI/ML solutions to difficult-to-discern challenges which apart from aspects of the present disclosure, otherwise would require huge data sets plus constantly evolving technology that is cannot be reasonably hosted at scale on premise at any given site; and an ability for users/agents to work from home with digital trunking and/or internet connectivity being highly secure and seamless from the perspective from the perspectives of the users/agents and of others who may be involved or bridged into the call.

Further, the example systems with such UC-CC communications-service platforms according to the present disclosure can provide a reliable call quality under significant loads. Contrary to some known on-premise PBX/call-center systems requiring significant amounts of CPU-based communications equipment and expensively-trained support staff to successfully manage large, especially spiky, call loads on premise, such UC-CC communications-service platforms may readily handle such call loads without such extensive equipment and support staff.

Yet others advantageous points concerns the high availability and recovery. The ability to recover from a disaster by such UC-CC communications-service platforms according to the present disclosure. Whereas, an on-premise PBX/CC system does not lend itself to a geographic outage (e.g., lines being cut, weather catastrophe, etc.). Further, such UC-CC communications-service platforms provide a multiple-sourced (e.g., double-sourced) telecommunications service across a PBX system and/or call-center via the UC-CC platform. This point is especially advantageous for organizations without a significant IT budget and/or which cannot manage two or more telecom providers (for redundancy/backup purposes) in a reliable, cost-effective manner. Consider also, the ability of such UC-CC communications-service platforms to handle seasonal bursting of resources as compared to an on-premises PBX/call-center system which is often painful and prohibitively expensive.

Additionally as another aspect of the present disclosure, in a system implementation a plurality of such UC-CC communications-service platforms (each according to one or more of the above embodiments of the present disclosure) is deployed redundantly across a mixture of private and/or public data clouds and collectively said plurality of platforms enable such UC-CC platforms to switch in real-time or near real-time (effectively instantly for purposes of a system operation from a user's perspective and/or experience) to a redundant platform in the case of any service interruption. This enables services to be provided to end customers seamlessly and/or without interruption. Accordingly, in such a system, UC-CC platforms may act as redundant subsystems with each such platform being deployed across a plurality of data networks and/or clouds to provide redundancy, and with the plurality of data networks and/or clouds being private and/or public and being configured to enable each of the UC-CC platforms to switch to another one of the UC-CC platforms for redundant real-time or near real-time operation in the case of any event indicative of a possible service interruption.

As another of many advantageous points, such UC-CC communications-service platforms according to the present disclosure are readily configurable to self-provision of software updates and integration of various virtual resources, and if used, with automatic updates of associations in the provider-side database (e.g., 101) and automated training of the AI/ML models to handle future incoming interactions with more-intelligent and increasingly improving outcomes of challenges. This is in contrast to certain known on-premise PBC/CC system in which although characterized as being fully unified, updating the software and ensuring the integration of all systems is functional cannot readily/practicably be done often and therefore may be very challenging and unduly expensive for IT staff to accommodate and more likely prone to error Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" or "module" (also sometimes "circuit-based module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Various embodiments are implemented in accordance with U.S. patent application Ser. No. 16/288,270, entitled "Analysis of Digital Voice Data in a Data-Communication Server System," filed Feb. 28, 2019, and which is fully incorporated herein by reference for its teachings. Reference may also be made to the teachings and underlying references provided in its underlying provisional application. Embodiments discussed therein are not intended, in any way, to be limiting to the overall technical disclosure, or to any part of the claimed invention unless specifically noted.

Similarly, it will be apparent that a server includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a (VoIP) endpoint device (or endpoint) includes a communication circuit and (computer) processing circuits which are configured to establish (VoIP) communication sessions with other endpoint devices. The communications circuit can be enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, a processing circuit or circuitry, as provided above, is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed:

1. A method comprising:
    receiving and processing, in a data-communications platform including a set of data-communications computer servers, incoming data-communication interactions ("incoming interactions") including different types of digitally-represented communications among which are incoming calls;
    providing access, in a database of information sets stored in a memory circuit that is integrated with the data-communications platform in terms of at least one of physical attributes and logical attributes characterizing authorized accesses to the memory circuit, to each of the information sets which represents aspects of past incoming data-communication interactions processed by the data-communications platform and which has data aggregated and organized based on data collected in response to previous ones of the incoming interactions;
    automatically training the data-communications platform, by use of an AI/ML (artificial intelligence and/or machine learning) algorithm to handle forthcoming incoming interactions based at least in part on processing of the past incoming data-communication interactions; and
    the data-communications platform responding to a respective one of the incoming interactions and to the automatically training, while the data-communications platform is integrated with the memory circuit, by:
        accessing, via the database, at least one of the information sets associated with the respective one of the incoming interactions;

utilizing from past interactions and at least one other data source; and facilitating, in response to the utilization of the data and to the access of the database, an automated self-service experience for respective users or originators of the incoming interactions through their processing, the automated self-service experience including at least one of: resolution of inquiries discerned through the incoming interactions; and call-decision routing of the incoming interactions to designated call-center agents or specialists having specific knowledge of subject matter discerned through the incoming interactions.

2. The method of claim 1, wherein for said at least one of the information sets associated with the respective one of the incoming interactions, the accessing via the database includes at least one of reading from the database and writing to the database.

3. The method of claim 1, wherein the data-communications platform is part of a data-communications system configured to communicate over a broadband network, including at least the Internet, with a plurality of remotely-located data-communications circuits respectively associated with a plurality of remotely-situated client entities that subscribe to communications services provided by the data-communications system.

4. The method of claim 1, wherein the data-communications platform refers to or includes a unified-communications and call center (UC-CC) platform.

5. The method of claim 1, wherein the data-communications platform refers to or includes data-communications and computer circuitry configured virtually to provide data-communication call centers for respective ones of a plurality of remotely-situated client entities that subscribe to communications services provided by the data-communications platform.

6. The method of claim 1, wherein the data-communications platform includes a plurality of data-communications servers respectively located in different physical locations.

7. The method of claim 1, wherein the automated self-service experience includes a party being automatically selected, in response to the data-communications platform accessing the database, to be bridged and joined into the respective one of the incoming interactions.

8. The method of claim 1, wherein the automated self-service experience includes the call-decision routing of the incoming interactions to designated call-center agents or specialists having specific knowledge of subject matter discerned through the incoming interactions.

9. The method of claim 1, wherein the automated self-service experience includes: a party being automatically selected, in response to the data-communications platform accessing the database, to be bridged and joined into the respective one of the incoming interactions; and the call-decision routing of the incoming interactions to designated call-center agents or specialists having specific knowledge of subject matter discerned through the incoming interactions.

10. The method of claim 1, wherein the database includes representations of digital voice data associated with transcribed audio conversations which correspond to one or more of the incoming interactions.

11. The method of claim 1, wherein the database includes representations of geographic information provided by or associated with the one or more of the incoming interactions.

12. The method of claim 1, wherein the database includes representations of calendar information provided by or associated with the one or more of the incoming interactions.

13. The method of claim 1, wherein the database includes representations of geographic information provided by or associated with the one or more of the incoming interactions, and includes representations of calendar information provided by or associated with the one or more of the incoming interactions.

14. The method of claim 10, wherein the representations of digital voice data include keywords and speech characteristic parameters associated with outcomes of or with contexts relating to the transcribed audio conversations.

15. The method of claim 1, wherein the data-communications platform effects the call-decision routing of the incoming interactions to the designated call-center agents or specialists based on a time-based assessment of whether the designated call-center agents or specialists are able to handle the routing of the incoming interactions.

16. The method of claim 1,
wherein the set of data-communications computer servers are configured to work together by collectively operating as a single unified server having integrated read and write access to the database without having to pass through a set of one or more disparately-managed security-screening filtering or gateway circuits.

17. A method comprising:
receiving and processing, in a data-communications platform including a set of data-communications computer servers, incoming data-communication interactions ("incoming interactions") including different types of digitally-represented communications among which are incoming calls;
providing access, in a database of information sets stored in a memory circuit that is integrated with the data-communications platform, to each of the information sets which represents aspects of past ones of the incoming data-communication interactions processed by the data-communications platform and which has data aggregated and organized based on data collected in response to the past ones of the incoming interactions; and
the data-communications platform responding to a respective one of the incoming interactions, while the data-communications platform is integrated with the memory circuit, by:
accessing, via the database, at least one of the information sets associated with the respective one of the incoming interactions;
utilizing from past interactions and at least one other data source; and
facilitating, in response to the utilization of the data and to the access of the database, an automated self-service experience for respective users or originators of the incoming interactions through their processing, the automated self-service experience including at least one of: resolution of inquiries discerned through the incoming interactions; and call-decision routing of the incoming interactions to designated call-center agents or specialists having specific knowledge of subject matter discerned through the incoming interactions, wherein the data-communications platform accesses the database through an access pathway that does not traverse at least one of a broadband gateway circuit and a security-based firewall circuit.

18. The method of claim 17, wherein the data-communications platform accesses the database through an access pathway that does not traverse a security-based firewall circuit.

19. The method of claim 17, wherein the data-communications platform accesses the database through an access pathway that does not traverse a broadband gateway circuit and does not traverse a security-based firewall circuit.

20. A method comprising:
receiving and processing, in a data-communications platform including a set of data-communications computer servers, incoming data-communication interactions ("incoming interactions") including different types of digitally-represented communications among which are incoming calls;
providing access, in a database of information sets stored in a memory circuit that is integrated with the data-communications platform, to each of the information sets which represents aspects of past incoming data-communication interactions processed by the data-communications platform and which has data aggregated and organized based on data collected in response to previous ones of the incoming interactions; and
the data-communications platform responding to a respective one of the incoming interactions, while the data-communications platform is integrated with the memory circuit, by:
accessing, via the database, at least one of the information sets associated with the respective one of the incoming interactions;
utilizing from past interactions and at least one other data source; and
facilitating, in response to the utilization of the data and to the access of the database, an automated self-service experience for respective users or originators of the incoming interactions through their processing, the automated self-service experience including at least one of: resolution of inquiries discerned through the incoming interactions; and call-decision routing of the incoming interactions to designated call-center agents or specialists having specific knowledge of subject matter discerned through the incoming interactions, wherein the data-communications platform accesses the database via an access pathway to a database manager circuit, wherein the access pathway to the database manager circuit is characterized by at least one of the following:
the access pathway to the database manager circuit does not traverse more than one broadband gateway circuit; and the access pathway to the database manager circuit does not traverse more than one security-based firewall circuit.

21. An apparatus comprising:
data-processor computing circuitry to:
receive and process, for or as part of a data-communications platform including a set of data-communications computer servers, incoming data-communication interactions ("incoming interactions") including different types of digitally-represented communications among which are incoming calls;
provide access, in a database of information sets stored in a memory circuit that is integrated with the data-communications platform, to each of the information sets which represents aspects of past incoming data-communication interactions processed by the data-communications platform and which has data aggregated and organized based on data collected in response to previous ones of the incoming interactions; and
respond, on behalf of or as part of the data-communications platform, to a respective one of the incoming interactions, while the data-communications platform is integrated with the memory circuit, by:
accessing, via the database, at least one of the information sets associated with the respective one of the incoming interactions;
utilizing certain of the past interactions and at least one other data source to automatically train the data-communications platform to handle forthcoming incoming interactions; and
facilitating, in response to the utilization of the data and to the access of the database, an automated self-service experience for respective users or originators of the incoming interactions through their processing, the automated self-service experience including at least one of: resolution of inquiries discerned through the incoming interactions; and call-decision routing of the incoming interactions to designated call-center agents or specialists having specific knowledge of subject matter discerned through the incoming interactions, wherein the data-processor computing circuitry is integrated with the data-communications platform in terms of at least one of physical attributes and logical attributes to restrict access to the database by broadband communication computing devices that are not integrated with the data-communications platform in terms of at least one of physical attributes and logical attributes.

22. A method comprising:
receiving and processing, in a data-communications platform including a set of data-communications computer servers, incoming data-communication interactions ("incoming interactions") including different types of digitally-represented communications among which are incoming calls;
providing access, in a database of information sets stored in a memory circuit that is integrated with the data-communications platform, to each of the information sets which represents aspects of past ones of the incoming interactions processed by the data-communications platform and which has data aggregated and organized based on data collected in response to the past ones of the incoming interactions; and
the data-communications platform responding to a respective one of the incoming interactions, while the data-communications platform is integrated with the memory circuit, by:
accessing, via the database, at least one of the information sets associated with the respective one of the incoming interactions;
utilizing from past interactions and at least one other data source; and
facilitating, in response to the utilization of the data and to the access of the database, an automated self-service experience for respective users or originators of the incoming interactions through their processing, the automated self-service experience including at least one of: resolution of inquiries discerned through the incoming interactions; and call-decision routing of the incoming interactions to designated call-center agents or specialists having specific knowledge of subject matter discerned through the incoming interactions, wherein the data-communications platform includes a plurality of data-communications servers respectively located in different physical locations, and the plurality of data-communications servers are configured to work together so that they collectively function as a single unified server having integrated read and write access to the database without having to pass through at least one of a gateway of a third party entity and a set of one or more disparately-managed security-screening filters.

23. The method of claim 22, wherein the plurality of data-communications servers are configured to work together by collectively operating as a single unified server having integrated read and write access to the database without having to pass through the gateway of a third party entity.

* * * * *